United States Patent
Chang et al.

(10) Patent No.: US 7,068,681 B2
(45) Date of Patent: Jun. 27, 2006

(54) APPARATUS AND METHOD FOR EXCHANGING VARIABLE-LENGTH DATA ACCORDING TO RADIO LINK PROTOCOL IN MOBILE COMMUNICATION SYSTEM

(75) Inventors: Hoon Chang, Seoul (KR); Hyun-Seok Lee, Songnam-Shi (KR); Dae-Gyun Kim, Seoul (KR); Chang-Hoi Koo, Soungnam-Shi (KR)

(73) Assignee: Samsung Electronics Co., Ltd. (KR)

( * ) Notice: Subject to any disclaimer, the term of this patent is extended or adjusted under 35 U.S.C. 154(b) by 116 days.

(21) Appl. No.: 10/642,476

(22) Filed: Aug. 15, 2003

(65) Prior Publication Data

US 2004/0120348 A1 Jun. 24, 2004

Related U.S. Application Data

(63) Continuation of application No. 09/568,276, filed on May 10, 2000, now Pat. No. 6,665,313.

(30) Foreign Application Priority Data

May 10, 1999 (KR) .............................. 99-17911

(51) Int. Cl.
 *H04J 3/04* (2006.01)
 *H04J 3/24* (2006.01)
 *H04B 7/216* (2006.01)

(52) U.S. Cl. ...................... 370/474; 370/535; 370/335
(58) Field of Classification Search ................ 370/335, 370/342, 389, 392, 394, 472, 476, 469; 709/236
See application file for complete search history.

(56) References Cited

U.S. PATENT DOCUMENTS 5,793,744 A 8/1998 Kanerva et al.
5,844,885 A 12/1998 Grob et al.
6,542,490 B1 * 4/2003 Ahmadvand et al. ....... 370/338
6,606,311 B1 * 8/2003 Wang et al. ................. 370/338
6,665,313 B1 * 12/2003 Chang et al. ................ 370/469
6,785,255 B1 * 8/2004 Sastri et al. ................. 370/338

FOREIGN PATENT DOCUMENTS

| CA | 2195410 | 5/1996 |
|---|---|---|
| EP | 0 877 513 | 11/1998 |
| EP | 0 877 5813 A1 | 11/1998 |
| EP | 0 903 883 A2 | 3/1999 |
| WO | WO 096/26582 | 8/1996 |

OTHER PUBLICATIONS

International Search Report dated Aug. 23, 2001.
European Search Report dated Apr. 2, 2003, issued in a counterpart application, namely, 00927870.6.
M.C. Chuah et al., "Performance comparisons of two retransmission protocols for CDMA," 1 Vehicular Technology Conference, 1996, Mobile Technology For The Human Race, Atlanta, GA May 1996, pp. 272–276.
R. Van Nobelen, "Towards Higher Data Rates for IS–136", Vehicular Technology Conference, VTC 98, 48th IEEE Ottawa, Ont., Canada, May 18–21, 1998, New York, NY, USA, May 18, 1998, p.

* cited by examiner

*Primary Examiner*—Duc Ho
(74) *Attorney, Agent, or Firm*—Dilworth & Barrese, LLP

(57) ABSTRACT

An information frame of a new format transmitted according to a radio link protocol (RLP), and a device and method for transmitting and receiving the information frame in a mobile communication system. The information frame is comprised of a plurality of consecutive multiplex frames each having a given length. The multiplex frames each are comprised of a header and a succeeding RLP frame, and the RLP frame includes transmission data. At least one of the multiplex frames is comprised of a plurality of sub-multiplex frames, and each sub-multiplex frame is comprised of a header including an RLP service identifier field and a length indication field for indicating a length of the transmission data, and a data block associated to the succeeding RLP frame.

4 Claims, 11 Drawing Sheets

TYPE A DATA BLOCK
FUNDAMENTAL LOW RATE FRAME
TYPE B DATA BLOCK
SUPPLEMENTAL FRAME
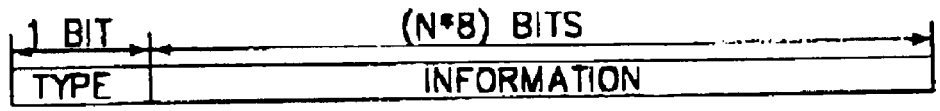
TYPE = '0'
FUNDAMENTAL RATE 1 FRAME
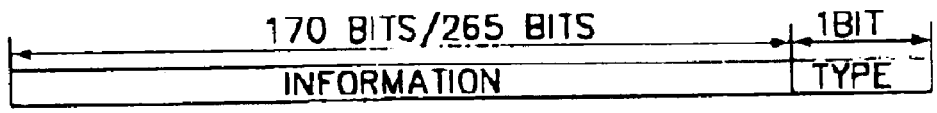
TYPE = '0'
TYPE C DATA BLOCK
SUPPLEMENTAL DATA FRAME
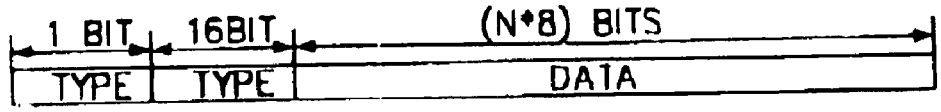
TYPE = '1'
FUNDAMENTAL RATE 1 DATA FRAME
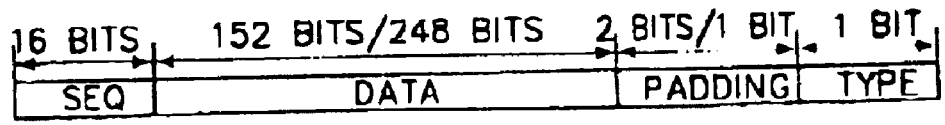
TYPE = '1'
FIG. 7

INFORMATION
EXCEPT 1/8 RATE
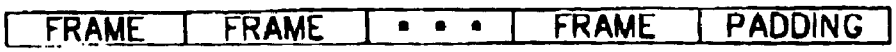
ONE CONTROL FRAME, OR AT MOST ONE DATA FRAME
AND RETRANSMITTED FRAMES
IDLE FRAME(1/8 .RATE ONLY)
SYNC, SYNC/ACK, ACK FRAME
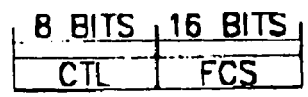
CTL – '11100001' FOR SYNC, '11100010' FOR
SYNC/ACK, '11100011' FOR ACK
VARIABLE-LENGTH DATA FRAME
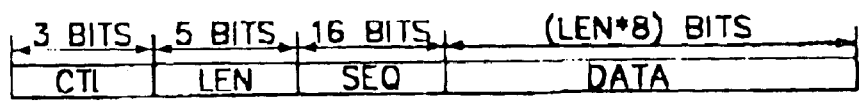
CTL = '001'
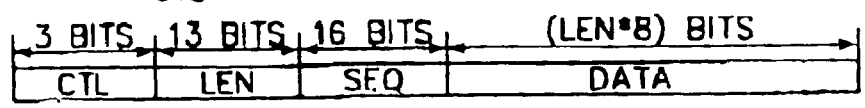
CTL = '010'
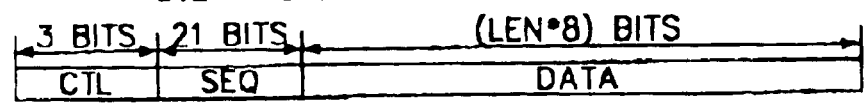
CTL = '100'
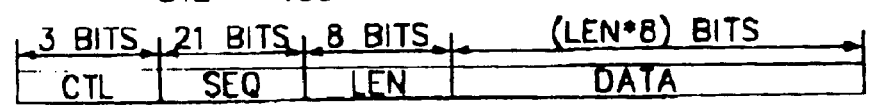
CTL = '101'
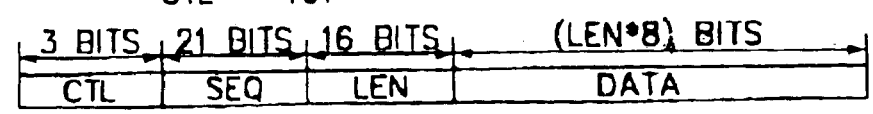
CTL = '110'
FIG. 8

APPARATUS AND METHOD FOR EXCHANGING VARIABLE-LENGTH DATA ACCORDING TO RADIO LINK PROTOCOL IN MOBILE COMMUNICATION SYSTEM

PRIORITY

This application is a continuation of application Ser. No. 09/568,276, filed May 10, 2000, now U.S. Pat. No. 6,665,313.

This application claims priority to an application entitled "Apparatus and Method for Exchanging Variable-Length Data according to Radio Link Protocol in Mobile Communication System" filed in the Korean Industrial Property Office on May 10, 1999 and assigned Serial No. 99-17911, the contents of which are hereby incorporated by reference.

BACKGROUND OF THE INVENTION

1. Field of the Invention

The present invention relates generally to a CDMA (Code Division Multiple Access) mobile communication system, and in particular, to a device and method for transmitting and receiving data according to a radio link protocol (RLP) used for effective data transmission in radio environments.

2. Description of the Related Art

In general, a CDMA mobile communication system has developed from the IS-95 standard which mainly provides a voice service into the CDMA-2000 standard which provides a high-speed data service as well as the voice service. The CDMA-2000 standard can provide high-quality voice service, moving picture service and Internet search service.

FIG. 1 shows an exemplary packet data service defined by the CDMA-2000 standard. In FIG. 1, a mobile station (MS) includes a terminal equipment (TE) and a mobile termination (MT). A base station is represented by BSIMSC (Base Station/Mobile Switching Center), and an interworking function block for connecting the BS/MSC to a data network (e.g., Internet), represented by IWF. The IWF block is a device for converting protocols from one to another, when different protocols are used. In FIG. 1, the upper service (or Web service) processors of the mobile station and the IWF block exchange data through a network protocol (or Internet protocol (IP)) processor and a link protocol (or point-to-point protocol (PPP)) processor. That is, the data assembled by the upper service processors is finally transmitted to the lower layers in the form of the link protocol packet, and the lower layers transmit the data using a proper protocol.

FIG. 1 shows an example where an EIA-232 controller is used between the TE and the MT. The link protocol packets transmitted to the MT through the EIA-232 controller are distributed to radio link protocol (RLP) frames through the RLP according to the present invention. Such generated RLP frame is transmitted over a physical channel connected according to the IS-2000 standard which is the CDMA-2000 standard. The RLP packets received at the base station over the connected physical channel are restored back to the link protocol packets and the restored packets are transmitted to the IWF block through the relay layer. In general, interfacing between the base station and the IWF block is performed according to the IS-658 standard. The IWF block reads data from the link protocol packets and transmits the data to the network protocol processor, and the data is finally transmitted to the upper service processor.

Although a description has been made of a process for transmitting data from the mobile station to the base station, the process for transmitting the data from the base station to the mobile station can be performed similarly. To provide various services, the CDMA-2000 standard supports various schemes different from that of FIG. 1. However, they have a common feature that the link protocol packets with the upper service data are transmitted over the radio physical channel through the RLP.

The RLP Type-3 specification generates only the RLP frame having a size proper to fill a physical channel frame of 9.6 Kbsp or 19.2 Kbps for the current Rate Set 1, or the RLP frame having a size proper to fill a physical channel frame of 14.4 Kbps or 28.8 Kbps for the Rate Set 2. Therefore, when the physical channel operates at the higher rate of 153.6 Kbps or 230.4 Kbsp, there is used a method for filling several RLP frames in one physical channel frame. If the physical channel supports the rate of over 153.6 or 230.4 Kbps which is the maximum rate supported in the RLP Type-3 specification, for example, if the physical channel supports the rates of 307.2 Kbps, 460.8 Kbps, 614.4 Kbps and 1036.8 Kbps, more RLP frames can be filled in one physical channel frame. However, as compared with the method for filling one physical channel with one large-sized RLP frame, this method causes an increase in a burden on the frame header and unusable parts of the frame, thereby decreasing the frame efficiency. Therefore, to transmit the RLP frame having the size larger than the current RLP Type-3 frame, a new method is required.

SUMMARY OF THE INVENTION

It is, therefore, an object of the present invention to provide a device and method for transmitting an RLP frame of various lengths by octet-based sequencing while transmitting data according to an RLP in a mobile communication system.

It is another object of the present invention to provide a device and method for transmitting an information frame (or physical frame) having various frame sizes and structures with more data by proposing effective multiplexing/demultiplexing control to support the RLP frame of various lengths while transmitting data according to an RLP in a mobile communication system.

To achieve the above objects, there is provided an information frame of a new format transmitted according to a radio link protocol (RLP), and a device and method for transmitting and receiving the information frame in a mobile communication system. The information frame is comprised of a plurality of consecutive multiplex frames each having a given length. The multiplex frames each are comprised of a header and a succeeding RLP frame, and the RLP frame includes transmission data. At least one of the multiplex frames is comprised of a plurality of sub-multiplex frames, and each sub-multiplex frame is comprised of a header including an RLP service identifier field and a length indication field for indicating a length of the transmission data, and a data block associated to the succeeding RLP frame.

BRIEF DESCRIPTION OF THE DRAWINGS

The above and other objects, features and advantages of the present invention will become more apparent from the following detailed description when taken in conjunction with the accompanying drawings in which:

FIG. 7 is a diagram illustrating a format of the data blocks generated according to the present invention;

FIG. 8 is a diagram illustrating a format of the RLP frames generated according to the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 2:
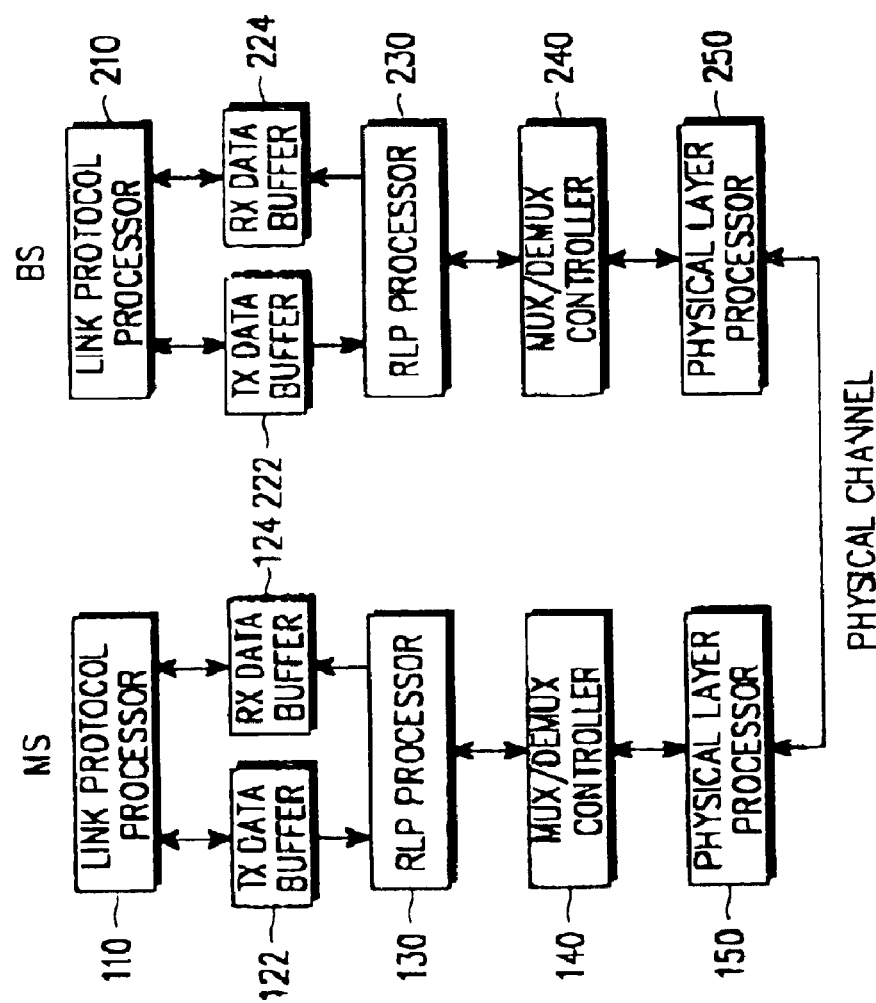
FIG. 2 is a diagram illustrating a device for transmitting and receiving data according to the RLP, to which the present invention is applicable.

FIG. 2 shows a structure of a mobile communication system for transmitting and receiving data according to the RLP, to which the present invention is applicable.

Referring to FIG. 2, physical layer processors 150 and 250 connect a physical channel between the mobile station and the base station according to the IS-2000 specification, transmit the RLP frames provided from associated RLP processors 130 and 230 to the other party's physical layer over the connected physical channel, and transmit the RLP frames received over the physical channel to the RLP processors 130 and 230.

Multiplexing/demultiplexing controllers 140 and 240 have the multiplexing function of attaching at the head of the RLP frames the destination and size information for the RLP frames to be transmitted to the physical layer processors 150 and 250, and transmitting the RLP frames to the physical layer processors 150 and 250. Further, the multiplexing/demultiplexing controllers 140 and 240 have the demultiplexing function of detecting the destination and size of the received RLP frames, and then transmitting the detection results to the upper RLP processors 130 and 230.

Figure 1:
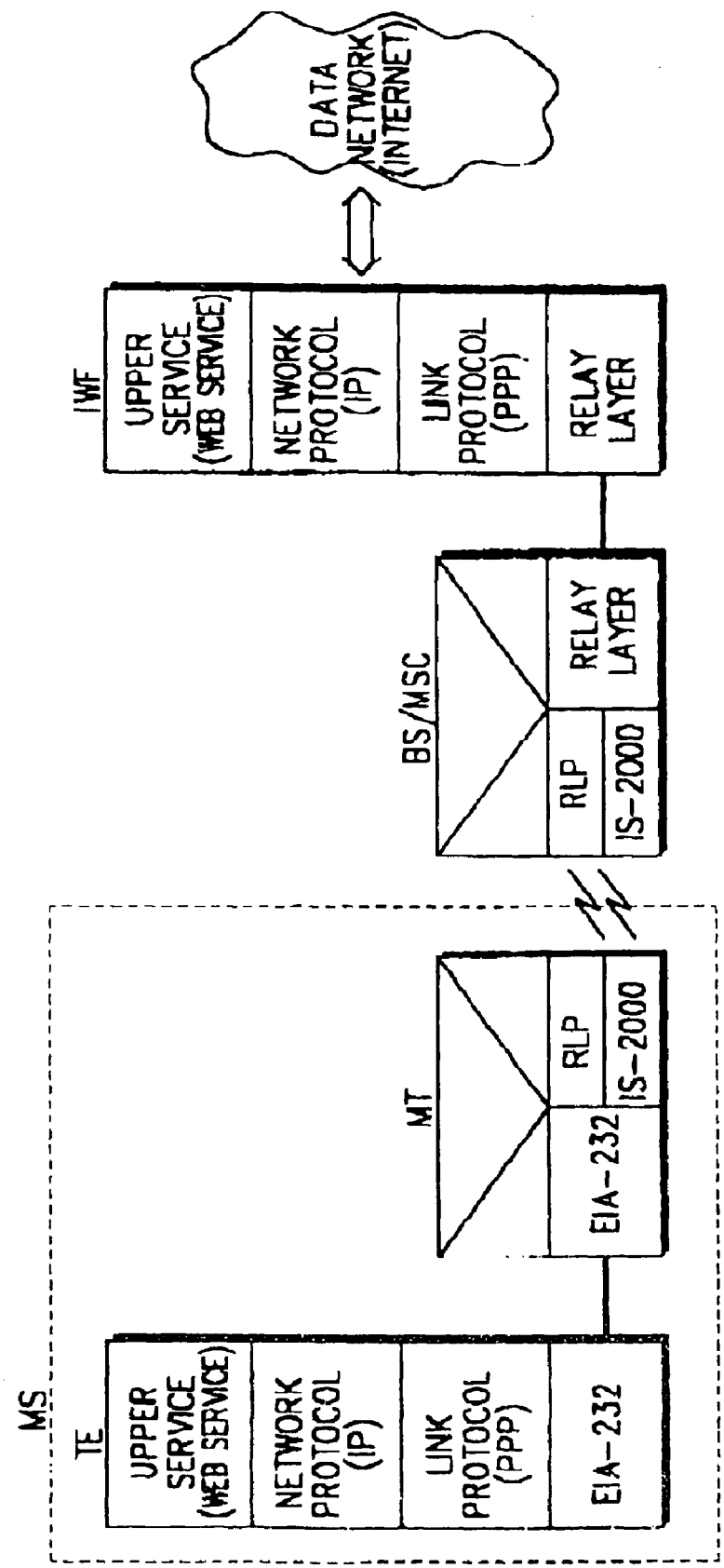
FIG. 1 is a diagram illustrating a general CDMA communication system for performing a packet data service.

Transmission and reception data buffers 122, 124, 222 and 224 are memory devices for storing data that the EIA-232 controller of FIG. 1 or the IS-658 controller has received from link protocol (PPP) processors 110 and 210. The data buffers 122 and 222 segment in sequence the stored packets by the required size at the request of the RLP processors 130 and 230. The data buffers 124 and 224 store in sequence the data provided from the RLP processors 130 and 230. The stored data is transmitted to the PPP processor or the IWF block by the EIA-232 controller or the IS-658 controller.

The EIA-232 controller or the IS-658 controller operates according to the EIA-232 specification and the IS-658 specification, and performs data exchange between the data buffers 122, 124, 222 and 224 and the link protocol processors 110 and 210. For the current CDMA-2000 packet service, it is possible to use a controller other than the EIA-232 controller and the IS-658 controller. For this reason, the controllers are not shown in FIG. 2.

Figure 3:
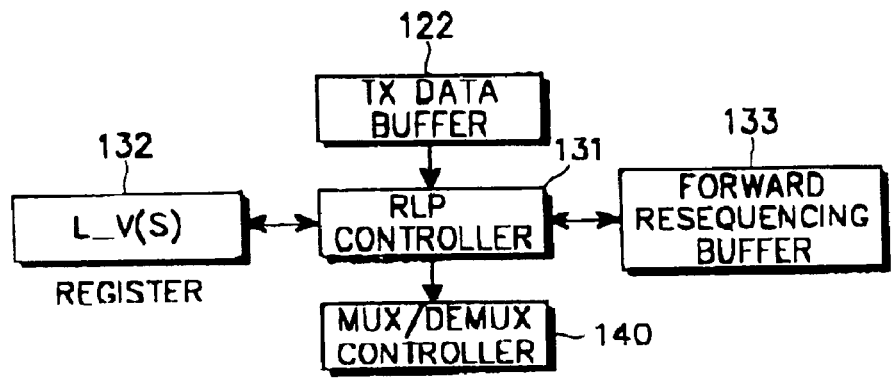
FIG. 3 is a diagram illustrating a data transmitter according to the present invention.

FIG. 3 shows a data transmitter according to the present invention. Referring to FIG. 3, the RLP processor 130 for transmitting the RLP frame includes an RLP controller 131, an L_V(S) register 132, and a forward resequencing buffer 133. The RLP controller 131 generates an RLP frame by receiving data from the transmission data buffer 122 and transmits a data block with the generated RLP frame to the multiplexing/demultiplexing controller 140. The forward resequencing buffer 133 is a memory device for storing data for resequencing. The L_V(S) register 132 stores, when transmitting the data on a byte unit basis, a sequence number of each byte.

Figure 4:
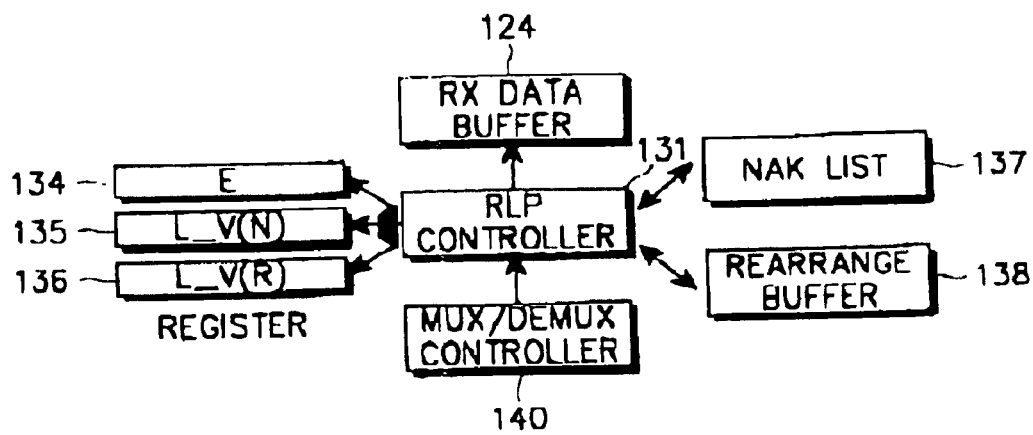
FIG. 4 is a diagram illustrating a data receiver according to the present invention.

FIG. 4 shows a data receiver according to the present invention. Referring to FIG. 4, the RLP processor 130 for receiving the RLP frame includes the RLP controller 131, an E register 134, an L_V(N) register 135, an L_V(R) register 136, a NAK list 137 and a rearrange buffer 138. The RLP controller 131 receives the RLP frame from the multiplexing/demultiplexing controller 140 and examines whether the data is received in order. If the data is received in order, the RLP controller 131 stores the data in the receiving data buffer 124. Otherwise, the RLP controller 131 stores the data in the rearrange buffer 138, and then records the portion (period) to be requested for retransmission in the NAK (Non Acknowledge) list 137, to transmit the period stored in the NAK list 137 when transmitting the next control frame.

The E register 134 records the number of damaged (or bad) data blocks. When the multiplexing/demultiplexing controller 140 notifies the damaged data blocks, the RLP controller 131 records this value in the E register 134 to use it when reestablishment is required. The RLP controller 131 judges that new data is received, when a data byte having a sequence number larger than or equal to the value of the L_V(R) register 136 is received. Otherwise, when a data byte having a sequence number smaller than the value of the L_V(R) register 136 and larger than or equal to the value of the L_V(N) register 135, the RLP controller 131 judges that retransmitted data is received. The L_V(N) register 135 stores the sequence number of the damaged data byte (or receive-failed data byte) out of the data to be received. That is, the L_V(N) register 135 stores the sequence number of the data byte to be received next out of the consecutively received data bytes. The L_V(R) register 136 stores the sequence number of the new data byte to be received next.

Operation of generating an RLP frame of variable length and transmitting/receiving the generated RLP frame according to the present invention can be broadly divided into operation performed by the multiplexing/demultiplexing controllers 140 and 240, and operation performed by the RLP processors 130 and 230. Since the multiplexing/demultiplexing controllers 140 and 240 have the same operation and the RLP processors 130 and 230 also have the same operation, a description of the operation according to the present invention will be limited to the multiplexing/demultiplexing controller 140 and the RLP processor 130, for simplicity. Herein, the general transmitting and receiving operation performed by the multiplexing/demultiplexing controller shown in FIGS. 2 to 4 will be first described. Next, a description will be made of the transmitting and receiving operation performed by the multiplexing/demultiplexing controller according to an embodiment of the present invention. The transmitting and receiving operation performed by the multiplexing/demultiplexing controller can be performed over the fundamental channel (FCH) or the supplemental channel (SCH). Next, a description will be made of the data transmitting and receiving operation performed by the RLP controller shown in FIGS. 3 and 4 according to the present invention.

A. Tx/Rx Operation of General Multiplexing/Demultiplexing Controller

1. Tx Operation of Multiplexing/Demultiplexing Controller

It is possible to simultaneously transmit not only the packet data but also various other information including the voice data over a presently connected physical channel. Therefore, providing data to be transmitted to the multiplexing/demultiplexing controller will be referred to as "service". Further, a transmission unit that the multiplexing/demultiplexing controller 140 and the physical layer processor 150 exchange with each other will be referred to as "information bits" or "physical frame", and a transmission unit that the upper service block, including the RLP processor 130, and the multiplexing/demultiplexing controller 140 exchange with each other will be referred to as "RLP frame" or "data block".

The multiplexing/demultiplexing controller 140 of the transmission side should generate the information bits to be transmitted to the physical layer processor 150 and transmit the generated information bits every set time (e.g., 20 ms). That is, the multiplexing/demultiplexing controller 140 should generate information bits to be filled in a payload of the frame to be transmitted over the physical channel with respect to all the presently connected physical channels and transmit the generated information bits. The multiplexing/demultiplexing controller 140 transmits the following values, when transmitting the generated information bits to the physical channel.

SDU: This field is filled with the information bits to be actually transmitted. If there is no information bit to be transmitted, this field is filled with a null value previously determined between the multiplexing/demultiplexing controller and the physical layer.

FRAME_SIZE: This field is filled with the size information of the physical channel frame in which the information bits are filled. When the SDU field is filled with the null value, this field value is ignored in the physical layer.

FRAME_RATE: This field indicates a transmission rate of the physical channel frame in which the information bits are filled. When the SDU field is filled with the null value, this field value is ignored in the physical channel.

When the multiplexing/demultiplexing controller 140 of the transmission side transmits the above field values to the physical layer processor 150, the physical layer processor 150 processes the provided values in the designated coding and demodulation method and then transmits the processed results to the receiving side.

To generate the payload or information bits of a logical transmission unit to be transmitted to the physical channel, the multiplexing/demultiplexing controller 140 of the transmission side uses a data block to be transmitted in the services corresponding to the physical channel to which the logical channel is presently connected. The service corresponding to the physical channel to which the logical channel is connected, refers to a service which can transmit its data block to the physical channel which will transmit the presently generated information bits. A process for connecting such a service between the mobile station and the base station and connecting the logical channel for the service to the physical channel is available with the signaling message and the signaling procedure, defined by the IS-2000 specification.

Figure 5:
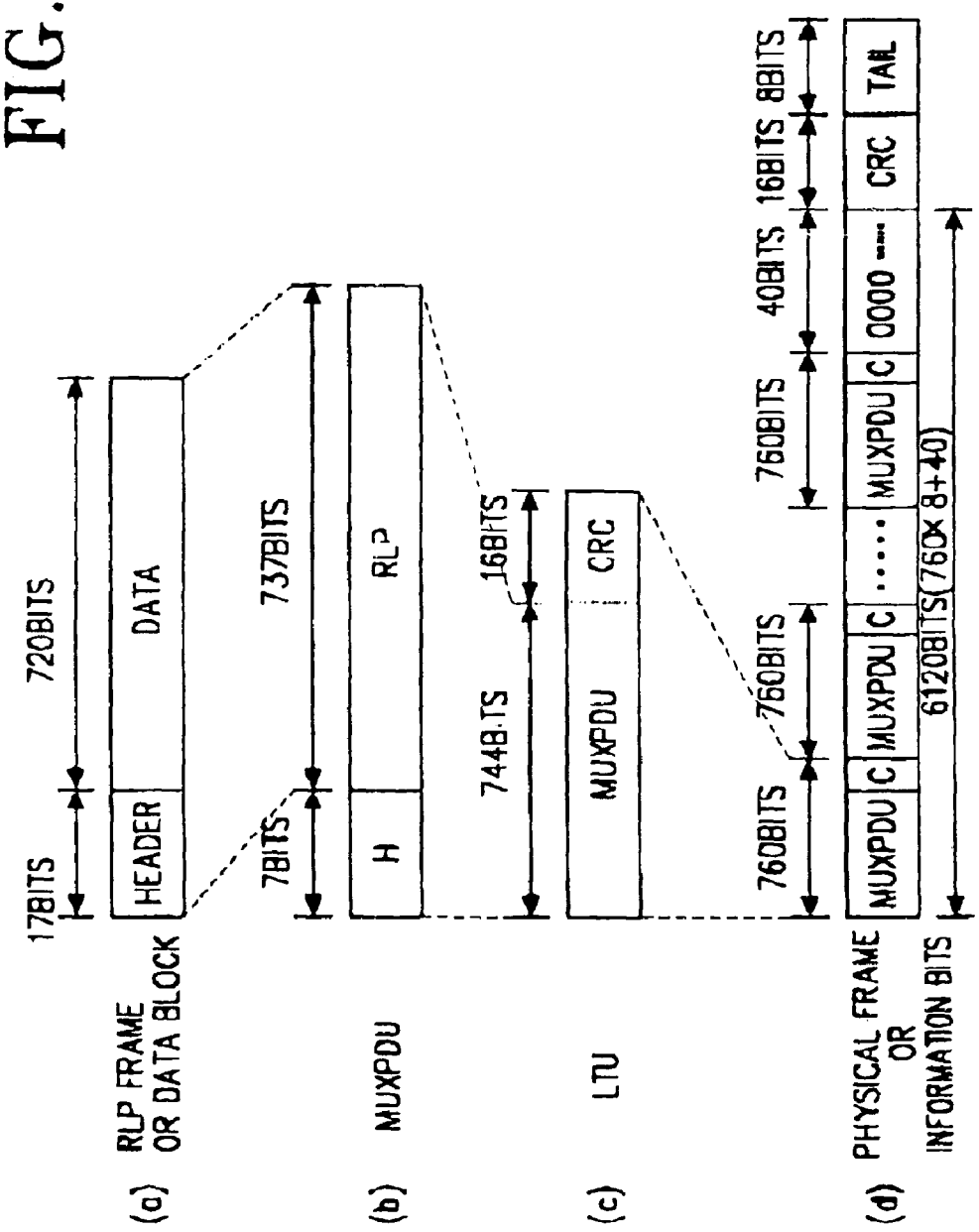
FIGS. 5A to 5D are diagrams illustrating a format of the frames generated by the data transmitter of FIG. 2.

The multiplexing/demultiplexing controller 140 of the transmission side receives the data block of a proper length (see FIG. 5A) from the service according to a priority order, upon deciding to transmit the data block for the services corresponding to the physical channel to which the logical channel is presently connected. The multiplexing/demultiplexing controller 140 creates a service identifier and a multiplex frame MuxPDU (see FIG. 5B) in which the length information is attached to the data block, so that it is possible to know a service for transmitting the data block received from the multiplexing/demultiplexing controller of the receiving side when receiving the data block from the service. The multiplex frame MuxPDU can include several data blocks and signaling messages provided from several services. The information bits include one or several MuxPDUs, and can further include a CRC (Cyclic Redundancy Code) for checking errors every one or several MuxPDUs. When the CRC for checking errors every several MuxPDUs is added, one CRC and a period of the information bits protected by the CRC are called a "logical transmission unit (LTU)". When the CRCs are inserted such that the information bits to be transmitted to the physical layer are segmented into several periods and error checking is performed on every segmented period, it is said that "logical transmission unit is used". Here, each period of the segmented information bits is referred to as "logical transmission unit", and the remaining period of the logical transmission unit excluding the CRC, protected by the CRC, will be referred to as "a payload of the logical transmission unit" (FIG. 5C). This logical transmission unit becomes a base unit for determining whether the physical frame is correctly received at the multiplexing/demultiplexing controller of the receiving side. If the logic transmission unit is not used, a basic unit for determining whether the physical frame is correctly received becomes the information bits.

The multiplexing/demultiplexing controller 140 of the transmission side previously knows a possible transmission rate and a size of the information bits with respect to the physical channel to be presently transmitted, and also knows whether the logic transmission unit is used or not, the size of the logic transmission unit if it is used, and a CRC generation method. Such a configuration is used to determine the size of the information bits generated by the multiplexing/demultiplexing controller 140 according to the present condition of the physical channel provided from the physical layer and determine a method for generating the logic transmission unit, within a limit previously determined between the mobile station and the base station.

When there is no more data block to be transmitted, the multiplexing/demultiplexing controller 140 uses the MuxPDU to which is attached a specific service identifier previously appointed with the multiplexing/demultiplexing controller of the receiving side, or uses a regular bit pattern previously appointed with the multiplexing/demultiplexing controller of the receiving side, in order to fill the remaining period of the information bits. Herein, the MuxPDU to which the specific service identifier is attached will be referred to as "fill MuxPDU" and the regular bit pattern will be referred to as "fill bit pattern".

When there is no signaling message or data block to be transmitted, the multiplexing/demultiplexing controller 140 can transmit the null value to the physical channel with SDU, or transmit a regular bit pattern previously appointed with the multiplexing/demultiplexing controller of the receiving side to the physical channel as the information bits. Herein, the regular bit pattern will be referred to as "null traffic".

When use of the logic transmission unit is determined, the multiplexing/demultiplexing controller 140 of the transmission side fills the payload of each logic transmission unit with the MuxPDU including the data block, fills the remaining period with the fill MuxPDU or the fill bit pattern, and then generates a CRC for the payload of each generated logic transmission unit. The multiplexing/demultiplexing controller 140 of the transmission side repeats the above process as many times as the number of the necessary logic transmission units, fills the information bits with the generated logic transmission units and then fills the remaining period with '0' before transmission to the physical channel.

When it is determined not to use the logic transmission unit, the multiplexing/demultiplexing controller 140 of the transmission side fills the information bits with the MuxPDU including the data block, fills the remaining period with the fill MuxPDU or the fill bit pattern, and then transmits the generated information bits to the physical channel.

2. Rx Operation of Multiplexing/Demultiplexing Controller

The physical layer processor 150 of the receiving side, shown in FIG. 2, analyzes a received signal using a designated decoding and demodulation method, and transmits the information bits filled in the received physical frame to the multiplexing/demultiplexing controller 140 of the receiving side. The physical layer controller 150 transmits the following information, when transmitting the analyzed information bits to the multiplexing/demultiplexing controller 140.

SDU: This field is filled with the information bits to be actually transmitted. If there is no received information bit or a damaged frame is received, this field is filled with a null value previously determined between the multiplexing/demultiplexing controller 140 and the physical layer processor 150.

FRAME_QUALITY: This field indicates whether or not the received frame is a valid frame.

FRAME_SIZE: This field is filled with the size information of the received physical channel frame. This field value is determined according to a transmission rate of the received physical channel frame.

FRAME_RATE: This field is filled with the transmission rate of the received physical channel frame.

The multiplexing/demultiplexing controller 140 of the receiving side previously knows a transmission rate and a size of the information bits with respect to the presently received physical channel, and also knows whether the logic transmission unit is used or not, the size of the logic transmission unit if it is used, and a CRC generation method. Such a configuration can be determined according to the above information provided from the physical channel processor 150 within a limit previously appointed between the mobile station and the base station.

If the multiplexing/demultiplexing controller 150 of the receiving side fills the SDU with the null value, judging that no physical channel frame is received, and informs the FRAME_QUALITY that a valid frame is received, then the multiplexing/demultiplexing controller 140 of the receiving side informs all the services corresponding to the physical channel to which the logical channel is connected that no frame is received.

When the physical layer processor 150 of the receiving side does not fill the SDU with the null value or informs the FRAME_QUALITY that a damaged frame is received, the multiplexing/demultiplexing controller 140 of the receiving side determines whether the logic transmission unit is used for the received frame, based on the configuration and the information provided from the physical layer processor 150 of the receiving side.

If the logic transmission unit is used, the multiplexing/demultiplexing controller 140 of the receiving side determines a length of the logic transmission unit, a CRC checking method and the number of the logic transmission units. The multiplexing/demultiplexing controller 140 separates the logic transmission units from the received information bits as many as the number of the logic transmission units.

When the assigned physical channel transmits the received information bits, the multiplexing/demultiplexing controller 140 of the receiving side determines whether the received information bits are damaged or not, depending on the FRAME_QUALITY transmitted from the physical channel. If the received information bits are damaged and the received information bits are segmented into several logic transmission units, the multiplexing/demultiplexing controller 140 analyzes the CRC of each logic transmission unit again, separated in the above process, to determine whether there exist error-free logic transmission units.

If there exists an erroneous logic transmission unit, the multiplexing/demultiplexing controller 140 informs all the services corresponding to the physical channel to which the logic channel is connected that a damaged data block is received, with respect to the erroneous logic transmission unit. At this point, the multiplexing/demultiplexing controller 140 also informs the maximum length of the corresponding service data block in which the damaged logic transmission unit can be included, with respect to the respective services.

When the received information bits are damaged and the received information bits have no CRC for checking an error every one or several MuxPDU, the multiplexing/demultiplexing controller 140 of the receiving side informs all the services corresponding to the physical channel to which the logical channel is connected that a damaged data block is received. At this point, the multiplexing/demultiplexing controller 140 also informs the maximum length of the corresponding service data block in which the damaged logic transmission unit can be included, with respect to the respective services.

When the error-free logic transmission unit or information bit is received, the multiplexing/demultiplexing controller 140 of the receiving side separates error-free MuxPDUs, which are not the fill bit pattern, from the information bits. If the separated MuxPDU is not the null traffic or the fill MuxPDU, the multiplexing/demultiplexing controller 140 transmits the data block included in the MuxPDU and a length of the data block to the service designated by the service identifier of the MuxPDU.

If the error-free logic transmission or information bit is received and there is a service which failed to receive the data block out of the services in which the logical channel corresponds to the physical channel, the multiplexing/demultiplexing controller 140 of the receiving side can inform that a null data block is received.

B. Tx/Rx Operation of Multiplexing/Demultiplexing Controller According to an Embodiment of the Invention A transmitting/receiving operation of the multiplexing/demultiplexing controller 140 according to the present invention will be more apparent from the following detailed description. The IS-2000 standard specifies several dedicated traffic channels such as a fundamental channel, a supplemental channel and a dedicated control channel. Therefore, the transmitting and receiving operation of the multiplexing/demultiplexing controller 140 according to the invention may be separately described for a case where it is applied to the fundamental channel and another case where it is applied to the supplemental channel. Further, the operation may be separately described for the case where the logic transmission unit is used and the other case where the logic transmission unit is not used. Here, the case where the logic transmission unit is used corresponds to a case where data is coded using a convolution code before transmitting and receiving the data, and the case where the logic transmission unit is not use corresponds to a case where the data is coded using a turbo code before transmitting and receiving the data.

1. Information Bit Number of Fundamental Channel and Supplemental Channel

Prior to describing an operation according to an embodiment of the present invention, the information bit number of the fundamental channel and the information bit number of the supplemental channel specified by the IS-2000 standard are first shown in Tables 1 to 4. Tables 1 and 2 show the information bit number of the fundamental channel specified by the IS-2000 standard, and Tables 3 and 4 show the information bit number of the supplemental channel. Tables 1 and 3 show the information bit number of Rate Set 1 based on the transmission rate of 9600 bps, and Tables 2 and 4 show the information bit number of Rate Set 2 based on the transmission rate of 14400 bps.

TABLE 1

Information Bit Number of IS-2000 Fundamental Channel (Rate Set 1)

| Transmission Rate | Information Bit Number |
| --- | --- |
| 9600 bps | 172 bits |
| 4800 bps | 80 bits |
| 2700 bps | 40 bits |
| 1500 bps | 16 bits |

TABLE 2

Information Bit Number of IS-2000 Fundamental Channel (Rate Set 2)

| Transmission Rate | Information Bit Number |
| --- | --- |
| 14400 bps | 267 bits |
| 7200 bps | 125 bits |
| 3600 bps | 55 bits |
| 1800 bps | 21 bits |

TABLE 3

Information Bit Number of IS-2000 Supplemental Channel (Rate Set 1)

| Transmission Rate | Information Bit Number |
| --- | --- |
| 9600 bps | 172 bits |
| 19200 bps | 360 bits |
| 38400 bps | 744 bits |
| 76800 bps | 1512 bits |
| 153600 bps | 3048 bits |

TABLE 3-continued

Information Bit Number of IS-2000 Supplemental Channel (Rate Set 1)

| Transmission Rate | Information Bit Number |
| --- | --- |
| 307200 bps | 6120 bits |
| 614400 bps | 12264 bits |

TABLE 4

Information Bit Number of IS-2000 Supplemental Channel (Rate Set 2)

| Transmission Rate | Information Bit Number |
| --- | --- |
| 14400 bps | 267 bits |
| 28800 bps | 552 bits |
| 57600 bps | 1128 bits |
| 115200 bps | 2280 bits |
| 230400 bps | 4584 bits |
| 460800 bps | 9192 bits |
| 1036800 bps | 20712 bits |

It should be noted that Tables 1 to 4 have not shown all the information bit sizes specified by the IS-2000 standard.

When the LTU (Logic Transmission Unit) is used corresponding to the information bit numbers having a sufficient number of bits shown in Tables 3 and 4, the size and number of the LTUs may be calculated as shown in Tables 5 and 6 below. At this point, the information bit number may be calculated by adding the bits remaining after multiplying the size of the LTU by the number of the LTU.

TABLE 5

LTU Applied to Supplemental Channel (Rate Set 1)

| Transmission Rate | LTU Size | LTU Number | Remaining Bits |
| --- | --- | --- | --- |
| 38400 bps | 368 bits | 2 | 8 bits |
| 76800 bps | 376 bits | 4 | 8 bits |
| 153600 bps | 376 bits | 8 | 40 bits |
| 307200 bps | 760 bits | 8 | 40 bits |
| 614400 bps | 1528 bits | 8 | 40 bits |

TABLE 6

LTU Applied to Supplemental Channel (Rate Set 2)

| Transmission Rate | LTU Size | LTU Number | Remaining Bits |
| --- | --- | --- | --- |
| 57600 bps | 560 bits | 2 | 8 bits |
| 115200 bps | 568 bits | 4 | 8 bits |
| 230400 bps | 568 bits | 8 | 40 bits |
| 460800 bps | 1144 bits | 8 | 40 bits |
| 1036800 bps | 2584 bits | 8 | 40 bits |

The MuxPDU formats proposed in the invention to fill the information bits are shown in Tables 7 to 12 below. Tables 7 and 8 show the MuxPDU formats for the information bits of the fundamental channel (FCH). Tables 9 and 11 show the MuxPDU formats for the information bits of the supplemental channel (SCH), for the case where the LTU is used. Tables 10 and 12 show the MuxPDU formats for the information bits of the supplemental channel, for the case where the LTU is not used.

TABLE 7

MuxPDU format for Information Bits of FCH (Rate Set 1)

| Tx Rate | 1st Service Data Block | Signaling Message | Service Data Block | Service Identifier | MuxPDU Header |
|---|---|---|---|---|---|
| 9600 bps | 171 bits | — | — | — | '0' |
| 9600 bps | 80 bits | 80 bits | — | — | '0001' |
| 9600 bps | 40 bits | 128 bits | — | — | '0101' |
| 9600 bps | 16 bits | 152 bits | — | — | '1001' |
| 9600 bps | — | 168 bits | — | — | '1101' |
| 9600 bps | 80 bits | — | 85 bits | 3 bits | '0011' |
| 9600 bps | 40 bits | — | 125 bits | 3 bits | '0111' |
| 9600 bps | 16 bits | — | 149 bits | 3 bits | '1011' |
| 9600 bps | — | — | 165 bits | 3 bits | '1111' |
| 4800 bps | 80 bits | — | — | — | — |
| 2700 bps | 40 bits | — | — | — | — |
| 1500 bps | 16 bits | — | — | — | — |

TABLE 8

MuxPDU format for Information Bits of FCH (Rate Set 2)

| Tx Rate | 1st Service Data Block | Signaling Message | Service Data Block | Service Identifier | MuxPDU Header |
|---|---|---|---|---|---|
| 14400 bps | 266 bits | — | — | — | '0' |
| | 124 bits | 138 bits | — | — | '00001' |
| | 54 bits | 208 bits | — | — | '00011' |
| | 20 bits | 242 bits | — | — | '00101' |
| | — | 262 bits | — | — | '00111' |
| | 124 bits | — | 135 bits | 3 bits | '01001' |
| | 54 bits | — | 205 bits | 3 bits | '01011' |
| | 20 bits | — | 239 bits | 3 bits | '01101' |
| | — | — | 259 bits | 3 bits | '01111' |
| | 20 bits | 222 bits | 17 bits | 3 bits | '10001' |
| 7200 bps | 124 bits | — | — | — | '0' |
| | 54 bits | 67 bits | — | — | '0001' |
| | 20 bits | 101 bits | — | — | '0011' |
| | — | 121 bits | — | — | '0101' |
| | 54 bits | — | 64 bits | 3 bits | '0111' |
| | 20 bits | — | 98 bits | 3 bits | '1001' |
| | — | — | 118 bits | 3 bits | '1011' |
| | 20 bits | 81 bits | 17 bits | 3 bits | '1101' |
| 3600 bps | 54 bits | — | — | — | '0' |
| | 20 bits | 32 bits | — | — | '001' |
| | — | 52 bits | — | — | '011' |
| | 20 bits | — | 29 bits | 3 bits | '101' |
| | — | — | 49 bits | 3 bits | '111' |
| 1800 bps | 20 bits | — | — | — | '0' |
| | — | — | 17 bits | 3 bits | '1' |

TABLE 9

MuxPDU format for Information Bits of SCH (Rate Set 1, LTU used)

| Tx Rate | Service Identifier | Length Indicator | Length Field | Reserved Field | Length of Service Data Block |
|---|---|---|---|---|---|
| 19200 bps | 3 bits | '0' | — | '000' | max 353 bits |
| 19200 bps | 3 bits | '1' | 11 bits | — | max 345 bits |
| 38400 bps | 3 bits | '0' | — | '000' | max 345 bits |
| 38400 bps | 3 bits | '1' | 11 bits | — | max 337 bits |
| 76800 bps | 3 bits | '0' | — | '000' | max 353 bits |
| 76800 bps | 3 bits | '1' | 11 bits | — | max 345 bits |
| 153600 bps | 3 bits | '0' | — | '000' | max 353 bits |
| 153600 bps | 3 bits | '1' | 11 bits | — | max 345 bits |
| 307200 bps | 3 bits | '0' | — | '000' | max 737 bits |
| 307200 bps | 3 bits | '1' | 11 bits | — | max 729 bits |
| 614400 bps | 3 bits | '0' | — | '000' | max 1505 bits |
| 614400 bps | 3 bits | '1' | 11 bits | — | max 1497 bits |

TABLE 10

MuxPDU format for Information Bits of SCH (Rate Set 1, LTU unused)

| Tx Rate | Service Identifier | Length Indicator | Length Field | Reserved Field | Length of Service Data Block |
|---|---|---|---|---|---|
| 9600 bps | 3 bits | '0' | — | '000' | max 161 bits |
| 9600 bps | 3 bits | '1' | 11 bits | — | max 153 bits |
| 19200 bps | 3 bits | '0' | — | '000' | max 353 bits |
| 19200 bps | 3 bits | '1' | 11 bits | — | max 345 bits |
| 38400 bps | 3 bits | '0' | — | '000' | max 737 bits |
| 38400 bps | 3 bits | '1' | 11 bits | — | max 729 bits |
| 76800 bps | 3 bits | '0' | — | '000' | max 1505 bits |
| 76800 bps | 3 bits | '1' | 11 bits | — | max 1497 bits |
| 153600 bps | 3 bits | '0' | — | '000' | max 3041 bits |
| 153600 bps | 3 bits | '1' | 11 bits | — | max 3033 bits |
| 307200 bps | 3 bits | '0' | — | '000' | max 6113 bits |
| 307200 bps | 3 bits | '1' | 11 bits | — | max 6105 bits |
| 614400 bps | 3 bits | '0' | — | '000' | max 12257 bits |
| 614400 bps | 3 bits | '1' | 11 bits | — | max 12249 bits |

TABLE 11

MuxPDU format for Information Bits of SCH (Rate Set 2, LTU used)

| Tx Rate | Service Identifier | Length Indicator | Length Field | Reserved Field | Length of Service Data Block |
|---|---|---|---|---|---|
| 28800 bps | 3 bits | '0' | — | '000' | max 545 bits |
| 28800 bps | 3 bits | '1' | 11 bits | — | max 537 bits |
| 57600 bps | 3 bits | '0' | — | '000' | max 537 bits |
| 57600 bps | 3 bits | '1' | 11 bits | — | max 529 bits |
| 115200 bps | 3 bits | '0' | — | '000' | max 545 bits |
| 115200 bps | 3 bits | '1' | 11 bits | — | max 537 bits |
| 230400 bps | 3 bits | '0' | — | '000' | max 545 bits |
| 230400 bps | 3 bits | '1' | 11 bits | — | max 537 bits |
| 460800 bps | 3 bits | '0' | — | '000' | max 1121 bits |
| 460800 bps | 3 bits | '1' | 11 bits | — | max 1113 bits |
| 1036800 bps | 3 bits | '0' | — | '000' | max 2561 bits |
| 1036800 bps | 3 bits | '1' | 11 bits | — | max 2553 bits |

TABLE 12

MuxPDU format for Information Bits of SCH (Rate Set 2, LTU unused)

| Tx Rate | Service Identifier | Length Indicator | Length Field | Reserved Field | Length of Service Data Block |
|---|---|---|---|---|---|
| 14400 bps | 3 bits | '0' | — | '000' | max 257 bits |
| 14400 bps | 3 bits | '1' | 11 bits | — | max 249 bits |
| 28800 bps | 3 bits | '0' | — | '000' | max 545 bits |
| 28800 bps | 3 bits | '1' | 11 bits | — | max 537 bits |
| 57600 bps | 3 bits | '0' | — | '000' | max 1121 bits |
| 57600 bps | 3 bits | '1' | 11 bits | — | max 1113 bits |
| 115200 bps | 3 bits | '0' | — | '000' | max 2273 bits |
| 115200 bps | 3 bits | '1' | 11 bits | — | max 2265 bits |
| 230400 bps | 3 bits | '0' | — | '000' | max 4577 bits |
| 230400 bps | 3 bits | '1' | 11 bits | — | max 4569 bits |
| 460800 bps | 3 bits | '0' | — | '000' | max 9185 bits |
| 460800 bps | 3 bits | '1' | 11 bits | — | max 9177 bits |
| 1036800 bps | 3 bits | '0' | — | '000' | max 20705 bits |
| 1036800 bps | 3 bits | '1' | 19 bits | — | max 20686 bits |

In Tables 7 to 12, the service identifier can be defined as shown in Table 13 below.

TABLE 13

| Service Identifier | |
|---|---|
| Service Identifier | Service |
| '000' | Reserved |
| '001' | 1st Service |
| '010' | 2nd Service |
| '011' | 3rd Service |
| '100' | 4th Service |
| '101' | 5th Service |
| '110' | 6th Service |
| '111' | Null Service |

In Table 13, the "null service" is a previously determined specific service identifier used to inform the multiplexing/demultiplexing controller of the receiving side that the MuxPDU is the fill MuxPDU. As can be appreciated from Table 13, the MuxPDU formats of Tables 7 to 12 can identify the data blocks provided from maximum 6 services.

Tables 7 and 8 show the MuxPDU formats transmitted to the fundamental channel. Here, the 1st service can be identified depending on only the MuxPDU header without the service identifier, because the case where the second lowest bit of the MuxPDU header is '0' corresponds to the 1st service. The data blocks corresponding to the 2nd to 6th services can be determined depending on the service identifiers of Table 7. Therefore, the service identifiers of Table 7 can have the values of '010' to '110'. When the data block of the 1st service is filled with all 1's in the fundamental channel using the MuxPDU format of Table 7, the multiplexing/demultiplexing controller of the receiving side appoints the null traffic which does not correspond to any service in the multiplexing/demultiplexing controller of the transmission side. Therefore, when the MuxPDU received from the fundamental channel has only the data block of the 1st service and the data block is filled with all 1's, the multiplexing/demultiplexing controller of the receiving side decides the data block as the null traffic.

2. Tx Operation of Multiplexing/Demultiplexing Controller through FCH

Figure 9:
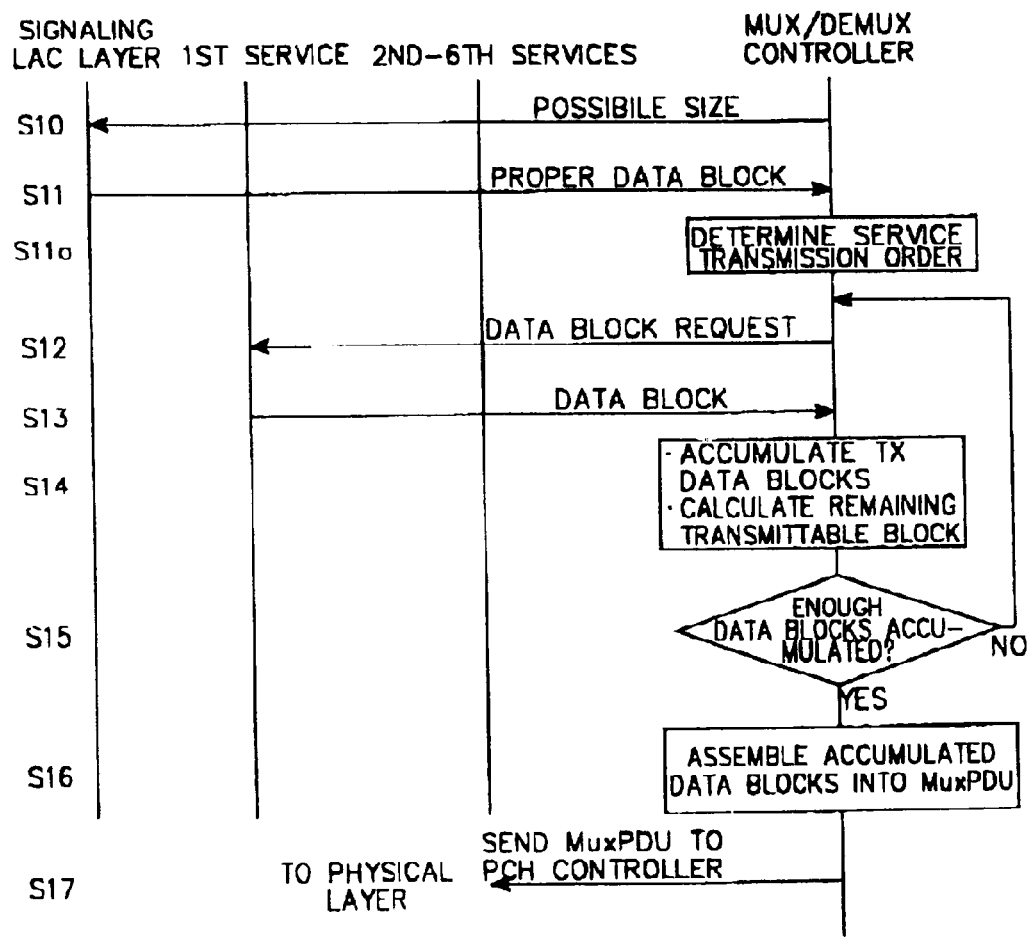
FIG. 9 is a flow diagram illustrating a procedure for transmitting a fundamental channel according to the present invention.

Assuming that the 6 services using the RLP are connected, the multiplexing/demultiplexing controller of the transmission side operates as follows. This operation is performed according to the procedure shown in FIG. 9.

First, the multiplexing/demultiplexing controller 140 of FIG. 3 determines the transmitting order of the services and the size of the data blocks according to a QoS (Quality of Service) guarantee rule. That is, the multiplexing/demultiplexing controller inquires of a signaling LAC layer about a possible size (Step S10 of FIG. 9), and receives information about a proper size for the data block from the signaling LAC layer (Step S11). The multiplexing/demultiplexing controller determines the order of transmitting the services (Step S11a), requests the 1st service to provide a data block of the determined size (Step S12), and receives the data block within the determined size from the 1st service (Step S13). For the data block to be transmitted to the fundamental channel, the RLP processor should be requested to generate the data block of a proper size according to the size and number of the data blocks that the MuxPDU permits in Table 7 or 8, and the Rate Set. Thereafter, the multiplexing/demultiplexing controller accumulates the data blocks to be transmitted and calculates the remaining blocks which can be transmitted (Step S14). Next, the multiplexing/demultiplexing controller determines whether or not it is possible to assemble the MuxPDU using the accumulated data blocks (Step S15). If it is not possible to assemble the MuxPDU, the multiplexing/demultiplexing controller returns to step S12 to request the corresponding service to provide the data block, and is provided with the requested data block. Otherwise, if it is possible to assemble the MuxPDU, the multiplexing/demultiplexing controller assembles the MuxPDU using the accumulated data block (Step S16). The multiplexing/demultiplexing controller selects a proper bit pattern from Table 4 and attaches the selected bit pattern to the MuxPDU header. The multiplexing/demultiplexing controller transmits the generated MuxPDU to the physical channel in the information bits (Step S17).

For the RLP processor which has failed to have an opportunity to generate the data block in the above process, the multiplexing/demultiplexing controller requests the RLP processor to generate a blank data block so as to enable the RLP processor to know the fact that it has failed to have the opportunity. In addition, if every RLP processor has provided no data block in the above process, the multiplexing/demultiplexing controller assembles the null traffic and transmits it to the physical channel in the information bits.

3. Rx Operation of Multiplexing/Demultiplexing Controller over FCH

Figure 10:
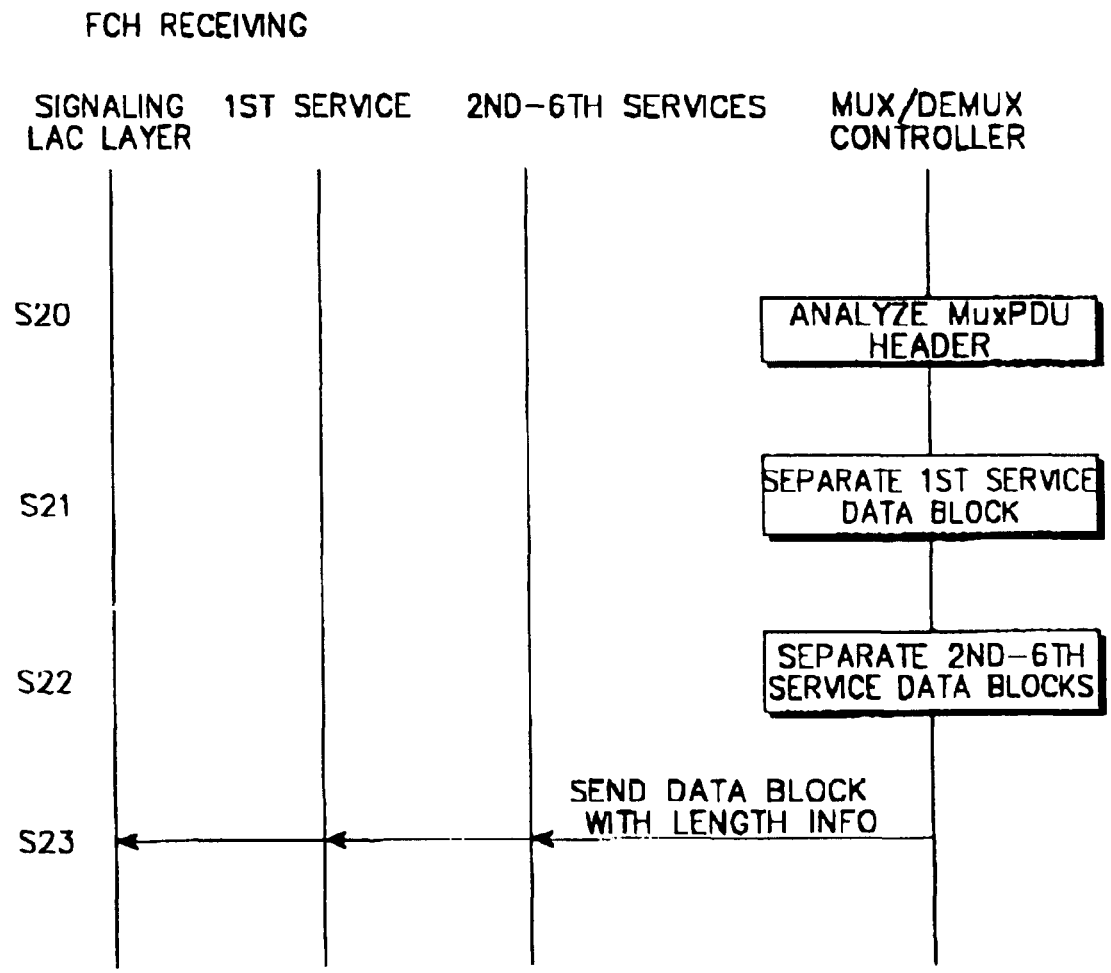
FIG. 10 is a flow diagram illustrating a procedure for receiving a fundamental channel according to the present invention.

The multiplexing/demultiplexing controller of the receiving side operates as follows with respect to the information bits transmitted over the fundamental channel. This operation is performed according to the procedure shown in FIG. 10. The multiplexing/demultiplexing controller analyzes the transmission rate and the MuxPDU header of the received information (Step S20 of FIG. 10), and distinguishes the data blocks (Steps S21 and S22) based on the analysis. The distinguished data blocks are transmitted to the corresponding services based on Tables 7 and 8. If the received information bits are damaged, the multiplexing/demultiplexing controller informs the fundamental channel that the damaged data block is received at all the services corresponding to the logical channel, and also informs the maximum length of the data block that the respective services can transmit (Step S23). Otherwise, the multiplexing/demultiplexing controller of the receiving side discards the data block, regarding it as the null traffic, when the information bits are not damaged, there exists only one data block and the data block corresponding to the 1st service is filled with all 1's. When the information bits are not damaged, the multiplexing/demultiplexing controller of the receiving side informs that a null data block is received, with respect to the services which have no received data block out of the services in which the logical channel corresponds to the fundamental channel.

4. Tx Operation of Multiplexing/Demultiplexing Controller through SCH

When generating the information bits for the supplemental channel, the multiplexing/demultiplexing controller generates the LTUs as many as the number shown in Table 5 or 6 according to the transmission rate. The LTU has the size shown in Table 5 or 6. Since the LTU has a 16-bit CRC, the maximum size of the MuxPDU (which is a function of transmission rate) which can be actually transmitted over the LTU must accommodate the CRC. In the invention, for example, where the supplemental channel has a transmission rate of 307.2 Kbps and the LTU is generated, the maximum MuxPDU size becomes 744 bits.

Figure 11:
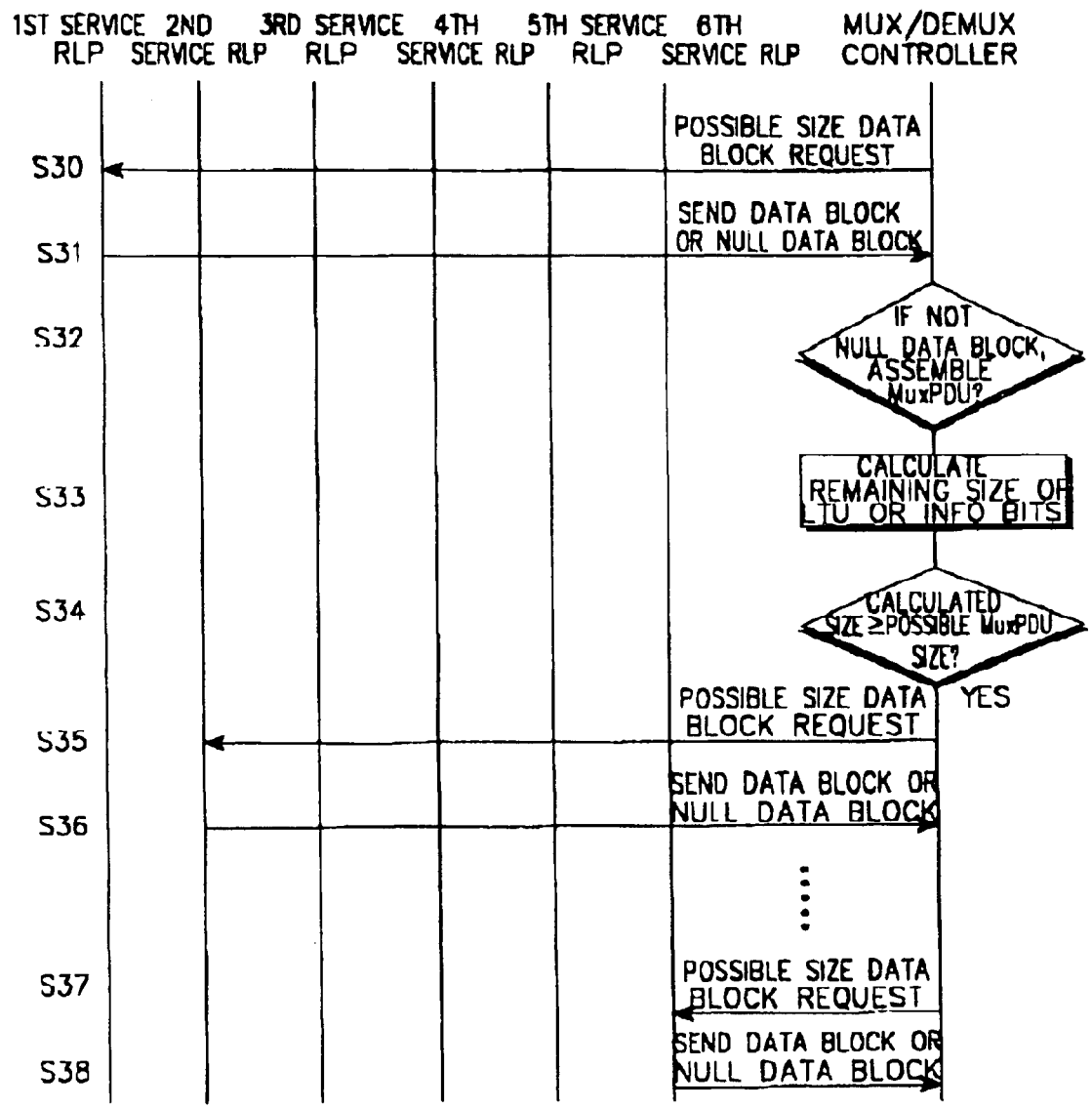
FIG. 11 is a flow diagram illustrating a procedure for transmitting a supplemental channel according to the present invention.

The multiplexing/demultiplexing controller generates the information bits of a size designated in Table 3 or 4 according to the transmission rate, if the LTU is not generated when the information bits for the supplemental channel are generated. The multiplexing/demultiplexing controller determines the order of transmitting the services and the size of the data blocks according to the QoS guarantee rule. Next, the multiplexing/demultiplexing controller sends a data block request to the RLP of the respective services according to the priority order (Step S30 of FIG. 11). For the data block to be transmitted to the supplemental channel, the multiplexing/demultiplexing controller requests the RLP processor to generate the data block of a proper size according to the size of the data block, permissible by the MuxPDU in Table 5, and the remaining period of the LTU being presently generated (Steps S32 to S37).

As can be appreciated from Table 5, if the RLP processor generates the data block of 737 bits or generates a data block having a size proper to fill the remaining period of the LTU, the multiplexing/demultiplexing controller sets the service identifier to the corresponding service and sets the length indicator to '0'. Further, the multiplexing/demultiplexing controller attaches a 3-bit reversed field and arranges the data block, thereby generating the MuxPDU. Since the generated MuxPDU fits into the payload of the LTU, one LTU is completed by generating a CRC and attaching the generated CRC to the MuxPDU.

As can be understood from Table 5, if the RLP generates the data block having a length of 729 bits or below and it is not possible to fill the remaining period of the LTU with the generated data block, the multiplexing/demultiplexing controller sets the service identifier to the corresponding service and sets the length indicator to '1'. The multiplexing/demultiplexing controller sets the 11-bit length field of the total MuxPDU including the service identifier, the length indicator, the length field and the data block, to a value expressed in byte unit. When the size of the total MuxPDU is not expressed in the byte unit, the multiplexing/demultiplexing controller discards the data block.

The above process is repeated for the period remaining after filling the generated MuxPDU in the payload of the LTU. If it is not possible to fill the remaining period with the valid MuxPDU, the multiplexing/demultiplexing controller fills the remaining period with all 0's. If there is no data block of proper size although it is possible to fill the remaining period with the valid MuxPDU, the multiplexing/demultiplexing controller creates a data block having a size proper to fill the remaining period and fills the data block with all 0's, and thereafter creates the MuxPDU, in which the service identifier is set to '111' and the length indicator is set to '0' and the 3-bit reversed field is set, and then fills the payload. A CRC is generated and attached to the generated payload for the LTU, thereby completing the LTU.

When it is necessary to generate 8 LTUs in the above process, the multiplexing/demultiplexing controller sequentially puts the generated 8 LTUs all in the information bits. The multiplexing/demultiplexing controller fills the remaining 40-bit period, shown in Table 5, with all 0's. An example of the information bits which can be obtained in this process is shown in FIGS. 6A to 6C.

Figure 6:
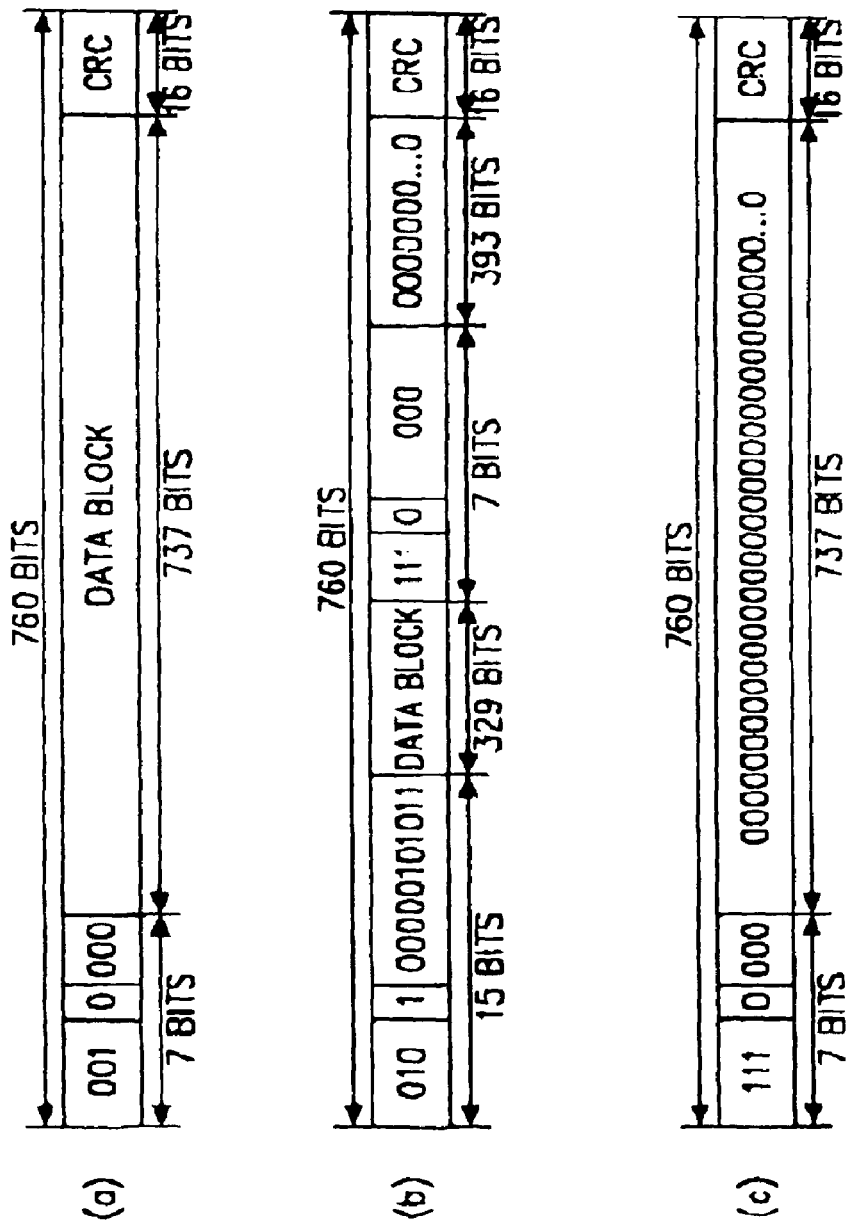
FIGS. 6A to 6C are diagrams illustrating a format of the LTU (Logical Transmission Unit) generated according to the present invention.

FIGS. 6A to 6C show several formats of the LTU generated according to the invention. Such LTUs constitute an information frame to be transmitted over the physical channel, and each LTU is comprised of the multiplex frame MuxPDU and the CRC. Although FIGS. 6A to 6C show an example where the information frame is comprised of the LTUs, the information frame may be comprised of only the multiplex frames MuxPDUs without the CRC. The consecutive multiplex frames MuxPDUs included in the information frame may have a given length (e.g., 744 bits as shown in FIG. 5C), and each multiplex frame MuxPDU is comprised of a header and a succeeding RLP frame (or data block) as shown in FIG. 5B. The RLP frame includes transmission data. In the invention, at least one of the multiplex frames is comprised of a plurality of sub-multiplex frames, and each sub-multiplex frame is comprised of a header including an RLP service identifier field and a length indicator field for indicating a length of the transmission data, and a succeeding data block. That is, the multiplex frame can be either one sub-multiplex frame comprised of a data block for a certain service and a header indicating the data block, or a plurality of sub-multiplex frames each comprised of a data block for a service and a header indicating the data block. FIG. 6A shows a case where the multiplex frame is comprised of one sub-multiplex frame, i.e., the multiplex frame includes only one data block. FIG. 6B shows a case where the multiplex frame is comprised of a plurality of sub-multiplex frames, i.e., the multiplex frame includes a plurality of data blocks. An operation of generating the data block (or RLP frame) is performed by the RLP controller 131 of FIG. 3, and an operation of generating the multiplex frame is performed by the multiplexing/demultiplexing controller 140 of FIG. 3. Further, an operation of generating the information frame (or physical frame) is performed by the physical layer processor 150 of FIG. 2.

Referring to FIG. 6A, a first LTU is provided with a 737-bit data block from the first service. In this case, the service identifier is set to '001', the length indicator is set to '0' and the payload of the LTU is filled with 3 reserved bits '000'. Here, the service identifier, the length indicator and the reserved bits constitute the header of the multiplex frame. The service identifier '001' indicates that the succeeding data block is for the first service as shown in Table 13, the length indicator '0' indicates that the multiplex frame includes only one data block, and the 3-bit reserved field indicates the length of the service data block as shown in Tables 9 to 12. For example, with reference to Table 9, assuming that the LTU is used at the Rate Set 1 and the transmission rate is 307200 bps, if the multiplex frame is comprised of only one service data block, then the length indicator is '0' and the reversed field is '000'. Therefore, the length of the service data block becomes maximum 737 bits.

Referring to FIG. 6B, a second LTU is provided with a 329-bit data block from the second service. In this case, the service identifier is set to '010', the length indicator is set to '1' and the length field is set to 43 bytes (00000101011) which is the total length of the MuxPDU. The remaining 50-byte payload period of the LTU is filled with the fill MuxPDU, when no service data block is provided. Here, the service identifier, the length indicator and the length field constitute the header of the multiples frame. The LTU, i.e., the multiplex frame is comprised of 2 sub-multiplex frames. In the first sub-multiplex frame, the service identifier '010' indicates that the succeeding data block is for the second service as shown in Table 13, the length indicator '1' indicates that the multiplex frame includes another data block in addition to the data block for the second service, and the 11-bit length field indicates the length of the service data block as shown in Tables 9 to 12. That is, the length indicator and the length field constitute a length indication field including information for indicating a length of the data to be transmitted.

In the second sub-multiplex frame, the service identifier '111' indicates that the succeeding data block is for the null service as shown in Table 13, the length indicator '0' indicates that the multiplex frame includes no data block in addition to the data block for the null service, and the 3-bit reserved field indicates the length of the service data block as shown in Tables 9 to 12. That is, the length indicator and the reserved field constitute a length indication field including information for indicating a length of the data to be transmitted.

Referring to FIG. 6C, a third LTU is provided with no data block from the services. In this case, the LTU is filled with the fill MuxPDU. The 8 LTUs shown in FIGS. 6A to 6C are filled in the information bits and the remaining 40 bits are set to '0', thus completing generation of the information bits (or information frame).

5. Rx Operation of Multiplexing/Demultiplexing Controller over SCH

The multiplexing/demultiplexing controller of the receiving side operates as follows for the information bits transmitted over the supplemental channel.

Figure 12:
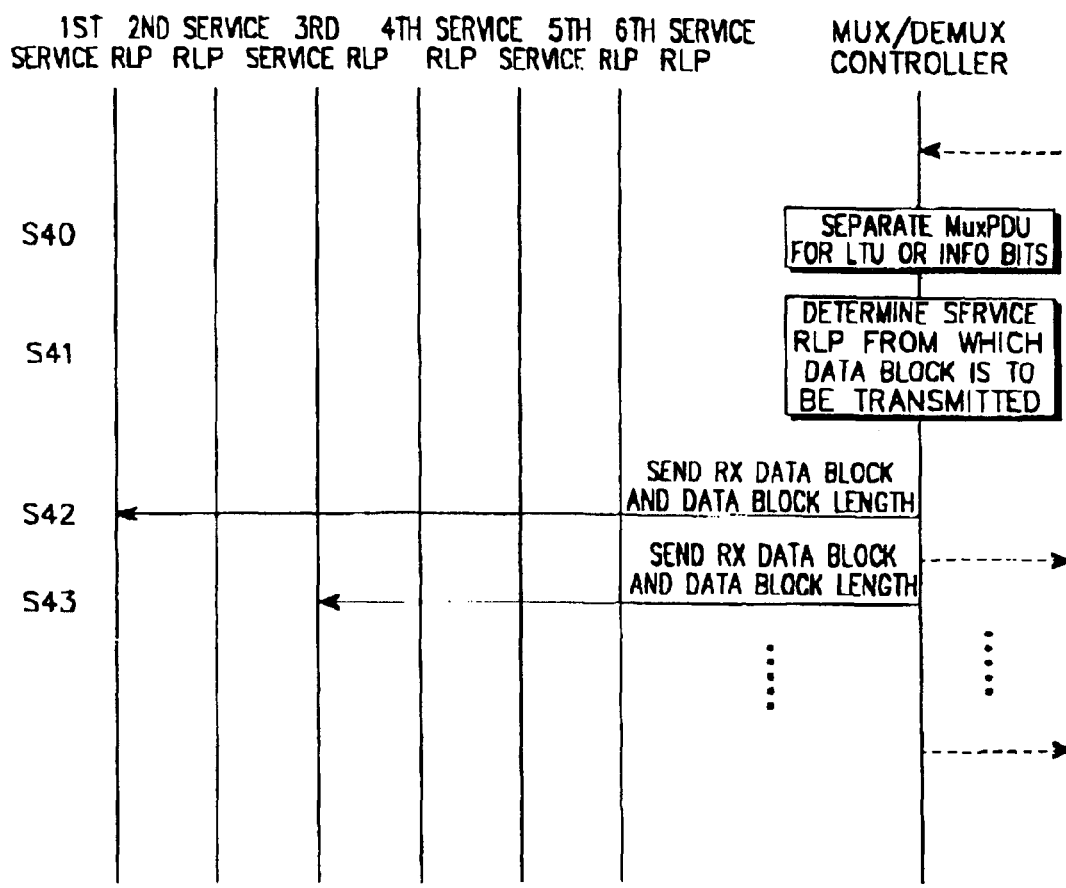
FIG. 12 is a flow diagram illustrating a procedure for receiving a supplemental channel according to the present invention.

For the information bits using the LTU, the LTU is divided according to the transmission rate as shown in FIGS. 5A to 5C. In the embodiment of the present invention, the supplemental channel is assumed to have a transmission rate of 307.2 Kbps, so that the LTU is divided by 760 bits. If the information bits have no error, the multiplexing/demultiplexing controller separates the MuxPDU from each LTU (Step S40 of FIG. 12). Otherwise, if the information bits have errors, the multiplexing/demultiplexing controller performs CRC checking on each LTU. At this point, the multiplexing/demultiplexing controller separates the MuxPDU for the error-free LTUs. However, for the LTUs having errors, the multiplexing/demultiplexing controller informs all the services, in which the logical channel corresponds to the supplemental channel, that a damaged data block is received, and also informs the maximum length of the data block that the respective services can transmit to the LTU, and then discards the information bits.

For the information bits not using the LTU, the MuxPDU are separated over the whole information bits. If the information bits have errors, the multiplexing/demultiplexing controller informs all the services, in which the logical channel corresponds to the supplemental channel, that a damaged data block is received, and also informs the maximum length of the data block that the respective services can transmit to the LTU, and then discards the information bits.

When separating the MuxPDUs over the LTU or information bits, which service the data block that the MuxPDU has been transmitted over and the total length of the MuxPDU are known from the service identifier, the length indicator and the length field. Therefore, the multiplexing/demultiplexing controller of the receiving side separates the MuxPDUs according to the length information of the MuxPDU, beginning at the front of the LTU or information bits, and transmits the data block to the upper service according to the service identifier. If the service identifier is set to '111' or the remaining period of the LTU or information bits is not long enough to put the valid MuxPDU therein, the multiplexing/demultiplexing controller discards all the remaining period of the LTU or information bits.

C. Tx/Rx Operation of RLP Controller According to the Invention

Operation performed by the RLP controller 131 shown in FIGS. 3 and 4 will be divided as follows.

1. Operation of RLP Controller before Data Transmission

Before starting operation, the RLP controller 131 initializes the L_V(S) register 132, the L_V(N) register 135, the L_V(R) register 136 and the E register 134, shown in FIGS. 3 and 4, to '0'. Before starting operation, the RLP controller 131 empties the forward resequencing buffer 133, the NAK list 137 and the rearrange buffer 138. Finally, the RLP controller 131 deactivates all the retransmission-related timers.

The types of the data blocks that the RLP controller 131 can transmit to the multiplexing/demultiplexing controller are shown in FIG. 7. FIG. 7 shows three types of the data blocks, by way of example.

In FIG. 7, an A-type data block is used when the fundamental channel transmits data at the transmission rate of below 9.6 Kbps or 14.4 Kbps, and has an information field only. The A-type data block fits into the data block size specified in Table 7 or 8. That is, when the A-type data block does not completely fill the specified data block size, the RLP controller 131 fills the data block with 0's so as to fit the data block into the specified data block size.

In FIG. 7, the B and C-type data blocks may be used when the fundamental channel transmits data at the transmission rate of 9.6 Kbps or 14.4 Kbps, or may be used for the supplemental channel. The B and C-type data blocks may be identified depending on the TYPE field. That is, the TYPE field '0' indicates the B-type data block, and the TYPE field '1' indicates the C-type data block.

The B-type data block is comprised of a 1-bit TYPE field and an INFORMATION field. In particular, for the fundamental channel, the B-type data block has the INFORMATION field of fixed length. That is, when the B-type data block is used for the fundamental channel, it is necessary to generate the INFORMATION field of 170 bits or 265 bits. However, when transmitting the B-type data block over the supplemental channel, such a limitation is not required.

The C-type data block is comprised of a 1-bit TYPE field, a 16-bit SEQ field and a DATA field having a length which is a multiple of 8. In particular, for the fundamental channel, the C-type data block has the DATA field of a fixed length. That is, when transmitting the C-type data block over the fundamental channel, it is necessary to fill the DATA field with 152 bits or 248 bits. However, when transmitting the C-type data block over the supplemental channel, such a limitation is not required.

The INFORMATION field defined in the A and B-type data blocks is shown in FIG. 8. Referring to FIG. 8, the INFORMATION field may include several RLP frames and the remaining period (portion) is filled with 0's, when the size of the INFORMATION field is not 16 bits, 17 bits, 20 bits or 29 bits. When the size of the INFORMATION field is 16 bits, 17 bits, 20 bits or 29 bits, the RLP frame includes the idle frame shown in FIG. 8. The idle frame of FIG. 8 includes 16-bit SEQ field, and the remaining period is filled with all 0's.

In the invention, the RLP frame of FIG. 8 will be called as follows. The SYNC, SYNC/ACK, ACK or NAK frame shown in FIG. 8 and Table 14 below will be referred to as a "control frame" and the frame filled with data will be referred to as a "data frame". The data frame is divided into a new data frame which contains new transmission data of at least one byte, and a retransmitted data frame which contains the retransmission data only. A frame having the 16-bit SEQ field only will be referred to as an idle frame, separately from the control frame and the data frame.

The INFORMATION field of FIG. 8 can include only one control frame; include one new data frame, 0's or several retransmitted data frames; or include only one idle frame.

When received a data block which does not satisfy the above conditions, the RLP controller 131 considers the received data block as a damaged (or bad) data block.

Prior to data transmission, the RLP controller 131 performs a reestablishing process. The RLP controller 131 continuously transmits the SYNC frame for the data block to the multiplexing/demultiplexing controller 140. Upon receipt of the SYNC frame from the multiplexing/ demultiplexing controller 140, the RLP controller 131 continuously transmits the SYNC/ACK frame to the multiplexing/demultiplexing controller 140 until a physical channel frame is received which is neither a null data block nor a SYNC frame. Upon receipt of the SYNC/ACK frame, the RLP controller 131 transmits an ACK frame to the multiplexing/demultiplexing controller 140. The RLP controller 131 continuously transmits the ACK frame, until the physical channel frame received from the multiplexing/demultiplexing controller 140 is neither the null data block nor the SYNC/ACK frame. The RLP controller 131 starts data transmission, when the physical channel frame is received and the received data block is not the null data block and has the RLP frame which is not the SYNC/ACK frame. Upon receipt of the ACK frame, the RLP controller 131 starts data transmission. The RLP controller 131 can transmit the frames other than the SYNC, SYNC/ACK and ACK frames to the multiplexing/demultiplexing controller 140.

2. Data Transmitting Operation of RLP Controller

For data transmission, the RLP controller 131 uses the 21-bit sequence number register L_V(S) 132. The RLP controller 131 determines a sequence number SEQ to be attached to the frame in the sequence number register L_V(S) 132. The sequence number uses a signless modulo operation with $2^{21}$. For a sequence number N, it is said that the sequence numbers from (N+1) modulo $2^{21}$ to (N+$2^{20}$–1) modulo $2^{21}$ is larger than N, and the sequence numbers from (N–$2^{20}$) modulo $2^{21}$ to (N–1) modulo $2^{21}$ is smaller than N.

The RLP controller 131 can use the value stored in the sequence number register L_V(S) 132 or a low bit value of the stored value for a physical sequence number to be attached to the actual data. That is, in the data frame, the lower 16 bits or all the lower 21 bits are used for the physical sequence number and in the idle frame, the lower 16 bits are used for the physical sequence number. The sequence number register L_V(S) 132 increases as much as the number of the filled data bits, when a data frame is created in which the data to be first transmitted is filled. That is, when the data frame is filled with the previously transmitted data, the L_V(S) register 132 is not increased.

The RLP controller 131 attaches a unique 21-bit sequence number every data byte of the new data frame from the L_V(S) register 132. That is, if L_V(S) is S to transmit N-byte data, then the first byte of the data has a sequence number of S, the nth byte has a sequence number of (S+n–1) modulo $2^{21}$, the last Nth byte has a sequence number of (S+N–1) modulo $2^{21}$. After transmitting the N-byte new data, the RLP controller 131 sets the L_V(S) register to (S+N) modulo $2^{21}$.

The RLP controller 131 stores the newly transmitted data in the forward resequencing buffer 133 together with the sequence number, preparing for the retransmission request from the receiving side. Upon receipt of a transmission request from the receiving side, the RLP controller 131 reads the data byte corresponding to the requested sequence number from the forward resequencing buffer 133 and retransmits the read data.

The RLP controller 131 assembles a frame to be transmitted, as follows. For the SYNC, SYNC/ACK, and ACK frames, the RLP controller 131 sets a CTL field according to the frame type and then attaches an FCS field, as shown in FIG. 8. The FCS field is a 16-bit frame check sequence created by a polynomial specified by RFC-1662. This FCS field is created for all the preceding bits.

For the NAK frame, the RLP controller 131 uses the structure shown in Table 14 below.

TABLE 14

NAK frame

| Field | Length |
|---|---|
| CTL | 8 bits |
| NAK_COUNT | 2 bits |
| The next fields are filled as many times as NAK_COUNT + 1 | |
| NAK_TYPE_AND_UNIT | 4 bits |
| When NAK_TYPE_AND_UNIT is '0001', the next fields are filled | |
| FIRST | 21 bits |
| LAST | 21 bits |
| When NAK_TYPE_AND_UNIT is a value defined in Table 15 or 16, the next fields are filled | |
| NAK_MAP_SEQ | 21 bits |
| NAK_MAP | 8 bits |
| The next fields are field for any NAK_TYPE | |
| PADDING_1 | Variable Length |
| FCS | 16 bits |
| PADDING_2 | Variable Length |

The RLP controller 131 creates the NAK frame as shown in Table 14. The CTL field of Table 14 is set to '11100100'. The RLP controller 131 sets the NAK_COUNT field to a value obtained by subtracting one from the retransmission request number included in the NAK frame. The RLP controller 131 performs the (NAK_COUNT+1) retransmission requests. The RLP controller 131 may perform the retransmission requests as follows.

When the NAK_TYPE_AND_UNIT field of the transmission request is set to '0001', the RLP controller puts the first sequence number of the consecutive retransmission requests in the FIRST field, and puts the last sequence number to the LAST field.

The RLP controller 131 may set the NAK_TYPE_AND_UNIT field as shown in Table 15 or 16 below. When the NAK_TYPE_AND_UNIT field is set as shown in Table 15 or 16, the RLP controller 131 performs retransmission request in NAK_MAP method.

Here, the NAK_MAP method refers to requesting retransmission using a NAK_MAP_SEQ field and a NAK_MAP field.

TABLE 15

NAK_TYPE_AND_UNIT field (Rate Set 1)

| Field Value | Number of Sequence Number |
|---|---|
| '0010' | 19 |
| '0011' | 41 |
| '0100' | 42 |
| '0101' | 90 |
| '0110' | 186 |
| '0111' | 378 |
| '1000' | 762 |
| '1001' | 1530 |
| '1010'–'1111' | Reserved |

TABLE 16

NAK_TYPE_AND_UNIT field (Rate Set 2)

| Field Value | Number of Sequence Number |
|---|---|
| '0001' | 31 |
| '0010' | 65 |
| '0011' | 66 |
| '0100' | 138 |
| '0101' | 318 |
| '0110' | 282 |

TABLE 16-continued

NAK_TYPE_AND_UNIT field (Rate Set 2)

| Field Value | Number of Sequence Number |
| --- | --- |
| '0111' | 570 |
| '1000' | 1146 |
| '1001' | 2586 |
| '1010'–'1111' | Reserved |

The RLP controller 131 fills the NAK_MAP field and NAK_MAP_SEQ field based on Table 15 or 16. The first sequence number is filled in the NAK_MAP_SEQ field, and the sequence numbers for requesting retransmission in the unit shown in Table 15 or 16 are filled in the NAK_MAP field. By using the NAK_MAP, the RLP controller 131 requests retransmission for the data corresponding to the sequence number belonging to (NAK_MAP_SEQ+U−1) modulo $2^{21}$, when the unit determined by the NAK_TYPE_AND_UNIT field is U; and requests retransmission for the data corresponding to the sequence number belonging to (NAK_MAP_SEQ+n*U) modulo $2^{21}$ to (NAK_MAP_SEQ+(n+1)*U−1) modulo $2^{21}$ whenever an nth bit from the most significant bit (MSB) of the NAK_MAP field is '1'. The value 'n' can have a value of 1 to 8.

For example, if the NAK_MAP_SEQ field is set to '0' and NAK_MAP field is '10000000' for the NAK_TYPE_AND_UNIT field='0010' and the Rate Set 1, the RLP controller retransmits the data corresponding to the sequence number of 0 to 37, upon receipt of the information.

The RLP controller 131 puts the (NAK_COUNT+1) transmission requests in the NAK frame, pads the FCS field with 0's for byte alignment and then fills the FCS field. The FCS field is a 16-bit frame check sequence created by the polynomial specified in the RFC-1662. The FCS field is created for all the preceding bits. After filling the FCS field, the RLP controller 131 fills the remaining period of the data block with 0's.

When transmitting the data, the RLP controller 131 may use the variable-length data frame shown in FIG. 8. When the data included in the variable-length data frame is new transmission data, the RLP controller 131 sets the SEQ field with the lower 16 or 21 bits of the L_V(S) register, and properly sets the CTL field as shown FIG. 8. A LEN field of the variable-length data frame indicates a length of the data period in a byte unit. The RLP controller 131 fills the period remaining after data filling, with 0's.

If it is determined that the lower 16 bits of the sequence number are sufficient for the SEQ field, the RLP controller 131 uses the 16-bit SEQ field of FIG. 8. However, where it is determined that all the 21 bits of the sequence number should be used due to great damage of the data, the RLP controller 131 uses the 21-bit SEQ field of FIG. 8.

The RLP controller 131 uses the shortest one, which can indicate the data length, out of the 5-bit, 13-bit, 8-bit and 16-bit LEN fields.

When the data included in the variable-length data frame is the retransmission data, the RLP controller 131 sets the SEQ field with the lower 16 or 21 bits of the sequence number S for the first byte, and properly sets the CTL field as shown FIG. 8. The LEN field indicates a length of the data period in a byte unit. The RLP controller 131 fills the remaining period of the data block with 0's.

When the CTL field is '100' in the variable-length data frame to be transmitted over the fundamental channel, for example, the RLP controller 131 fills the data block with 144-bit data for the Rate Set 1 and 240-bit data for the Rate Set 2.

If there is no data to transmit or there are no SYNC, SYNC/ACK, ACK and NAK frames to transmit, the RLP controller 131 may transmit the data block in which the SEQ field of the variable-length data frame is set with the lower 16 or 21 bits of the L_V(S), the LEN field is set to '0', and the remaining period is filled with 0's. In this case, the CTL field is set to a proper value.

If the multiplexing/demultiplexing controller 140 requests a data block having a length of 16 bits, 20 bits or 32 bits, or there is no data to transmit or there are no SYNC, SYNC/ACK, ACK and NAK frames to transmit, then the RLP controller 131 may transmit the idle frame shown in FIG. 8. To create the idle frame, the RLP controller 131 fills the SEQ field with the lower 16 bits of the L_V((S). The RLP controller 131 fills the remaining period of the data block with 0's.

3. Data Receiving Operation of RLP Controller

When receiving data, the RLP controller 131 uses the L_V(N) 135 and the L_V(R) 136, which are 21-bit sequence number registers. The sequence number register L_V(R) 136 indicates the sequence number of the new data byte to be received next, and the sequence number register L_V(N) 135 indicates the sequence number of a data byte to be received next, out of the consecutively received data bytes. That is, the RLP controller 131 may transmit the data to the upper link protocol only when the data byte having the sequence number stored in the L_V(N) arrives. A data byte having the sequence number larger than or equal to L_V(R) is new data, whereas a data byte having a sequence number smaller than L_V(R) and larger than or equal to L_V(N) is retransmission data. The RLP controller 131 cannot discard the data byte having the sequence number smaller than L_V(N), because it is the previously received data.

The RLP controller 131 typically has the NAK list 137 shown in FIG. 4. Each entry of the NAK list 137 has a 21-bit sequence number and a data byte corresponding to the sequence number, and also has a retransmission timer and an abort timer. When the retransmission data arrives, the RLP controller 131 detects an entry where the 16-bit sequence number for the received data byte is consistent with the lower 16-bit of the stored NAK entry.

If the received data-filled frame includes the 16-bit SEQ field, the RLP controller 131 takes this value for S and calculates a sequence number L_SEQ for the first byte of the received data, as follows. That is, the RLP controller 131 detects the entries having consistent sequence numbers from the NAK list 137 in the order of older entries. The RLP controller 131 determines whether the NAK list 137 has an entry where the lower 16-bit period of the 21-bit sequence number is consistent with the sequence number S of the received frame. If there is a consistent NAK entry, the RLP controller 131 takes the 21-bit sequence number stored in the entry as the sequence number L_SEQ of the first byte. Otherwise, if there is no NAK entry, the RLP controller 131 calculates the sequence number L_SEQ for the first byte of the received data using the sequence number S of the received frame, in accordance with Equation 1 below.

$$L\_SEQ = \{L\_V(N)+[2^{16}+S-L\_V(N)] \text{ modulo } 2^{16}\} \text{ modulo } 2^{21} \quad \text{(Eq. 1)}$$

If the received data-filled frame includes the 21-bit SEQ field, the RLP controller 131 takes this value for L_SEQ.

The RLP controller 131 sequentially attaches the sequence numbers for the respective data bytes of the received data frame, which start from L_SEQ. That is, an nth data byte has a sequence number L=(L_SEQ+n−1), and thus, the first byte takes the L_SEQ value for the sequence number. The RLP controller 131 performs the following operation on the data bytes of the received data frame in the order of the sequence numbers.

First, if the sequence number, L, of the received data byte is smaller than L__V(N), the RLP controller 131 discards the received data byte.

Second, if the sequence number, L, of the received data byte is larger than or equal to L__V(N) and smaller than L__V(R), the RLP controller 131 stores the received data byte in the rearrange buffer 138. At this point, if the sequence number L=L__V(N), the RLP controller 131 transmits the data bytes stored in the rearrange buffer 138 to the upper link protocol, from the data byte having the sequence number L__V(N) to the data byte having the sequence number which can be successively transmitted. In this process, if the sequence number of the last transmitted data byte is LAST, the RLP controller 131 sets L__V(N) to (LAST+1) modulo $2^{21}$.

Third, if the sequence number, L, of the received data byte is equal to L__V(R) and L__V(R) is equal to L__V(N), the RLP controller 131 increases both L__V(R) and L__V(N), and then performs modulo operation for $2^{21}$. Otherwise, if L__V(R) is not equal to L__V(N), the RLP controller 131 transmits the received data byte to the upper link protocol, increases L__V(R) and then performs modulo operation for $2^{21}$. The RLP controller 131 stores the received data byte in the rearrange buffer 138.

Fourth, if the sequence number, L, of the received data byte is larger than L__V(R), the RLP controller 131 creates an entry for each data byte in the NAK list 137 in order to request retransmission for the data byte having (L−1) modulo $2^{21}$ in the sequence number L__V(R). Each entry has a 21-bit sequence number for the corresponding data byte. In addition, the RLP controller 131 stores the received data bytes in the rearrange buffer 138 and then sets L__V(R) to (L+1) modulo $2^{21}$.

Meanwhile, upon receipt of the idle frame, the RLP controller 131 sets the sequence number S to the SEQ field value and then calculates the sequence number L__SEQ in accordance with Equation 2 below.

$$L\_SEQ=\{L\_V(R)+[2^{16}+S-L\_V(R)] \text{ modulo } 2^{16}\} \text{ modulo } 2^{21} \quad (2)$$

If the sequence number, L__SEQ, of the received idle frame is larger than L__V(R), the RLP controller 131 creates an entry for each data byte in the NAK list in order to request retransmission for the data byte having (L__SEQ−1) modulo $2^{21}$ in the sequence number L__V(R). Each entry has a 21-bit sequence number for the corresponding data byte. The RLP controller sets L__V(R) to (L+1) modulo $2^{21}$.

When the multiplexing/demultiplexing controller 140 informs that the damaged data block is received and informs the size of the data block, the RLP controller 131 predicts the maximum value, M, of the data byte which can be received, as follows. If the damaged data block was transmitted over the fundamental channel and the Rate Set 1 is being used, then M is 19 bytes. If the damaged data block was transmitted over the fundamental channel and the Rate Set 2 is being used, M is 31 bytes. Otherwise, if the damaged data block was transmitted over the supplemental channel, then M is a value determined by dividing, by 8, a value obtained by subtracting 17 bits from the L-bit length of the damaged data block informed by the multiplexing/demultiplexing controller 140. For example, if the informed length of the damaged data block is 737 bits, then M=(737−17)/8=90.

After determining the maximum data byte number, M, of the damaged data block, the RLP controller 131 adds this value to the value stored in the register E 134 and then stores it again in the register E 134. If the added value is larger than $2^{16}$, the RLP controller 131 performs the above reestablishing process.

In the data receiving process, if there exists at least one correctly received data block which is not the null data block or if the multiplexing/demultiplexing controller informs that no frame has been received, the RLP controller 131 sets the register E 134 to '0'.

4. Operation of RLP Controller after Data Receiving

After processing all the received frame, the RLP controller 131 performs the following operation. When the multiplexing/demultiplexing controller 140 informs the RLP controller 131 that no frame has been received, or when an idle frame is received or a new transmitted data frame is received, the RLP controller 131 performs the following processes on the entries in the NAK list 137 in the order of the older entries.

First, if an abort timer has not expired yet and the sequence number, included in the NAK has been transmitted three times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry. Otherwise, if the RLP controller 131 has not received the retransmitted data byte corresponding to the sequence number that the NAK entry already has, the RLP controller 131 transmits to the upper link protocol the received data bytes which are larger than the sequence number of the NAK list stored in the rearrange buffer 138 and can be successively transmitted to the upper link protocol, considering that the data byte corresponding to the sequence number of the NAK entry is not received. The RLP controller 131 sets L__V(N) to the sequence number of the data byte to be received next.

Second, if the abort timer has not expired yet and the sequence number, that the NAK entry has, was included in the NAK which has already transmitted two times, the RLP controller 131 decreases the abort timer value by one. If the abort timer value becomes '0', the RLP controller 131 performs the following operation. If the RLP controller 131 has received the retransmitted data byte corresponding to the sequence number that the NAK entry already has, the RLP controller 131 deletes the NAK entry. Otherwise, if the RLP controller 131 has not received the retransmitted data byte corresponding to the sequence number that the NAK entry already has, the RLP controller 131 sets the abort timer of the NAK entry to a proper value. The RLP controller 131 includes the sequence numbers, that the NAK entry has, in the three NAK frames to be transmitted next.

The RLP controller 131 sets the retransmission timer to a proper value for the NAK entries which should be newly added, and includes the sequence numbers, that the NAK entry has, in the two NAK frames to be transmitted next.

As described above, the invention provides a data byte-based sequence number when transmitting data according to a radio link protocol (RLP), thereby enabling the radio link protocol to generate the variable-length frame.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting frames in a mobile communication system which transmits frames for several services, the method comprising the steps of:

creating a multiplex frame of a given length including at least one RLP frame determined according to a service priority; and assembling a plurality of the consecutive multiplex frames into an information frame of a predetermined length and transmitting the information frame.

2. A data transmission device in a mobile communication system comprising:

a plurality of RLP processors each for processing unique service data and generating an RLP frame of a predetermined length;

a multiplexing controller for determining a length of the RLP frame generated from the RLP processors, and assembling a multiplex frame; and a physical layer processor for assembling a plurality of consecutive multiplex frames into an information frame of a second length and transmitting the information frame.

3. A method for receiving frames in a mobile communication system which receives an information frame comprised of a plurality of consecutive multiplex frames, each multiplex frame including at least one RLP frame having a header attached at the head thereof, the method comprising the steps of:

demultiplexing each multiplex frame included in the received information frame; and separating at least one RLP frame included in the demultiplexed multiplex frame according to an RLP service using a length indicator of the header, and outputting the separated RLP frame to the corresponding RLP service for processing.

4. A device for receiving frames in a mobile communication system which receives an information frame comprised of a plurality of consecutive multiplex frames, each multiplex frame including at least one RLP frame, at the head of which a header is attached, the device comprising:

a demultiplexing controller for separating at least one RLP frame included in each multiplex frame in the received information frame according to an RLP service using a length indicator of the header; and a plurality of RLP processors for performing a corresponding service on the separated RLP frame.

* * * * *